US010009950B2

(12) United States Patent
Yoon

(10) Patent No.: US 10,009,950 B2
(45) Date of Patent: *Jun. 26, 2018

(54) APPARATUS AND METHOD FOR TRANSMITTING D2D DATA BASED ON RESOURCE PATTERN

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/691,636

(22) Filed: Aug. 30, 2017

(65) Prior Publication Data

US 2017/0367137 A1 Dec. 21, 2017

Related U.S. Application Data

(63) Continuation of application No. 14/820,461, filed on Aug. 6, 2015, now Pat. No. 9,775,186, which is a (Continued)

(30) Foreign Application Priority Data

Aug. 8, 2014 (KR) .................. 10-2014-0102572
Aug. 8, 2014 (KR) .................. 10-2014-0102662

(51) Int. Cl.
*H04W 72/12* (2009.01)
*H04W 76/14* (2018.01)
*H04W 76/02* (2009.01)

(52) U.S. Cl.
CPC ....... *H04W 76/14* (2018.02); *H04W 72/1289* (2013.01); *H04W 76/023* (2013.01)

(58) Field of Classification Search
CPC ............... H04W 76/02; H04W 76/023; H04W 72/1289; H04W 72/1278
(Continued)

(56) References Cited

U.S. PATENT DOCUMENTS

2010/0128695 A1 5/2010 Nagaraja
2013/0084914 A1 4/2013 Wu et al.
(Continued)

FOREIGN PATENT DOCUMENTS

WO WO 2013012241 1/2013
WO WO 2013139041 9/2013
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," Jun. 2014 pp. 1-121, 3GPP TS 36.211 V12.2.0, 3GPP Organizational Partners.
"3rd Generation Partnership Project; Technical Specification Group Radio Access Network; Evolved Universal Terrestrial Radio Access (E-UTRA); Physical layer procedures (Release 12)," Jun. 2014 pp. 1-207, 3GPP TS 36.213 V12.2.0, 3GPP Organizational Partners.
International Search Report for International Patent Application No. PCT/KR2015/008185, dated Nov. 24, 2015.
(Continued)

*Primary Examiner* — Kwang B Yao
*Assistant Examiner* — Syed M Bokhari

(57) ABSTRACT

A method and apparatus for supporting a device-to-device (D2D) communication between user equipments (UEs) are provided. A method of transmitting device-to-device (D2D) data using a D2D data transmission resource by a user equipment (UE), the method including: receiving, at a UE, configuration information associated with a D2D data transmission resource, the configuration information including information of a D2D data allocation period and being transmitted from an evolved NodeB (eNB); determining, at the UE, a D2D data transmission resource in each D2D data allocation period, the D2D data transmission resource including a pool of subframes; selecting D2D data trans-
(Continued)

mission subframes from among the pool of subframes based on a changed pattern, the changed pattern being derived from a basic pattern; and transmitting, from the UE to another UE, D2D data based on the selected D2D data transmission subframes.

6 Claims, 15 Drawing Sheets

Related U.S. Application Data continuation-in-part of application No. 14/819,232, filed on Aug. 5, 2015, now Pat. No. 9,750,016.

(58) Field of Classification Search
USPC .................................................. 370/336, 330
See application file for complete search history.

(56) References Cited

U.S. PATENT DOCUMENTS

| | | | |
|---|---|---|---|
| 2013/0109301 A1 | 5/2013 | Hakola et al. | |
| 2014/0094183 A1 | 4/2014 | Gao et al. | |
| 2015/0085719 A1 | 3/2015 | Yin et al. | |
| 2015/0334698 A1* | 11/2015 | Park | H04W 4/005 455/426.1 |
| 2016/0021625 A1 | 1/2016 | Li et al. | |
| 2016/0044724 A1 | 2/2016 | Seo et al. | |
| 2016/0198507 A1* | 7/2016 | Wu | H04W 8/005 370/330 |
| 2016/0323870 A1* | 11/2016 | Wei | H04W 72/042 |

FOREIGN PATENT DOCUMENTS

| | | |
|---|---|---|
| WO | WO 2013177447 | 11/2013 |
| WO | WO 2013191518 | 12/2013 |

OTHER PUBLICATIONS

Written Opinion for International Patent Application No. PCT/KR2015/008185, dated Nov. 24, 2015.
Intel Corporation, "eNB Controlled Resource Allocation for D2D Communication", R1-142017, 3GPP TSG-RAN WG1 Meeting #77, Seoul, Korea, May 19-23, 2014, pp. 1-6, 3GPP.
Samsung, "D2D synchronization procedure for resource pool configuration", R1-142119, 3GPP TSG-RAN WG1 Meeting #77, Seoul, Korea, May 19-23, 2014, pp. 1-6, 3GPP.
Qualcomm Incorporated, "Signal Design for D2D Synchronization", R1-141453, 3GPP TSG-RAN WG1 #76bis, Shenzhen, China, Mar. 31-Apr. 4, 2014, pp. 1-9, 3GPP.
International Search Report for International Patent Application No. PCT/KR2015/008317, dated Dec. 15, 2015.
Written Opinion for International Patent Application No. PCT/KR2015/008317, dated Dec. 15, 2015.
LG Electronics, "Discussion on Signaling for D2D Communication Resource Allocation", R1-142147, 3GPP TSG-RAN WG1 Meeting #77, Seoul, Korea, May 19-23, 2014, pp. 1-8, 3GPP.
Qualcomm Incorporated, "WF on SA content and design", R1-142653, 3GPP TSG-RAN WG1 Meeting #77, Seoul, Korea, May 19-23, 2014, pp. 1-4, 3GPP.
Qualcomm Incorporated, "Status Report to TSG", RP-141015, 3GPP TSG RAN Meeting #64, Sophia Antipolis, France, Jun. 10-13, 2014, pp. 1-25, 3GPP.
English Translation of International Search Report for International Patent Application No. PCT/KR2015/008185, dated Nov. 24, 2015.
English Translation of Written Opinion for International Patent Application No. PCT/KR2015/008185, dated Nov. 24, 2015.
English Translation of International Search Report for International Patent Application No. PCT/KR2015/008317, dated Dec. 15, 2015.
English Translation of Written Opinion for International Patent Application No. PCT/KR2015/008317, dated Dec. 15, 2015.

* cited by examiner

FIG. 8

|  | D2D data transmission resource index | | | |
|---|---|---|---|---|
|  | 0 | 1 | 2 | 3 |
|  | 1 | 1 | 1 | 1 |
| (4, 2) basic pattern 0 | 1 | -1 | 1 | -1 |
| (4, 2) basic pattern 1 | 1 | 1 | -1 | -1 |
| (4, 2) basic pattern 2 | 1 | -1 | -1 | 1 |
|  | -1 | -1 | -1 | -1 |
| (4, 2) basic pattern 3 | -1 | 1 | -1 | 1 |
| (4, 2) basic pattern 4 | -1 | -1 | 1 | 1 |
| (4, 2) basic pattern 5 | -1 | 1 | 1 | -1 |

FIG. 9

|  | D2D data transmission resource index | | | | | | | |
|---|---|---|---|---|---|---|---|---|
|  | 0 | 1 | 2 | 3 | 4 | 5 | 6 | 7 |
|  | 1 | 1 | 1 | 1 | 1 | 1 | 1 | 1 |
| (8, 4) basic pattern 0 | 1 | -1 | 1 | -1 | 1 | -1 | 1 | -1 |
| (8, 4) basic pattern 1 | 1 | 1 | -1 | -1 | 1 | 1 | -1 | -1 |
| (8, 4) basic pattern 2 | 1 | -1 | -1 | 1 | 1 | -1 | -1 | 1 |
| (8, 4) basic pattern 3 | 1 | 1 | 1 | 1 | -1 | -1 | -1 | -1 |
| (8, 4) basic pattern 4 | 1 | -1 | 1 | -1 | -1 | 1 | -1 | 1 |
| (8, 4) basic pattern 5 | 1 | 1 | -1 | -1 | -1 | -1 | 1 | 1 |
| (8, 4) basic pattern 6 | 1 | -1 | -1 | 1 | -1 | 1 | 1 | -1 |
|  | -1 | -1 | -1 | -1 | -1 | -1 | -1 | -1 |
| (8, 4) basic pattern 7 | -1 | 1 | -1 | 1 | -1 | 1 | -1 | 1 |
| (8, 4) basic pattern 8 | -1 | -1 | 1 | 1 | -1 | -1 | 1 | 1 |
| (8, 4) basic pattern 9 | -1 | 1 | 1 | -1 | -1 | 1 | 1 | -1 |
| (8, 4) basic pattern 10 | -1 | -1 | -1 | -1 | 1 | 1 | 1 | 1 |
| (8, 4) basic pattern 11 | -1 | 1 | -1 | 1 | 1 | -1 | 1 | -1 |
| (8, 4) basic pattern 12 | -1 | -1 | 1 | 1 | 1 | 1 | -1 | -1 |
| (8, 4) basic pattern 13 | -1 | 1 | 1 | -1 | 1 | -1 | -1 | 1 |

(Xrep, Yrep)=(16, 4)

(Xnew, Ynew)=(16, 4)

(X, Y)=(8, 4)

(Xnew, Ynew)=(16, 4)

(Xnew, Ynew)=(16, 10)

(X, Y)=(16, 8)

(Xrep, Yrep)=(10, 5)

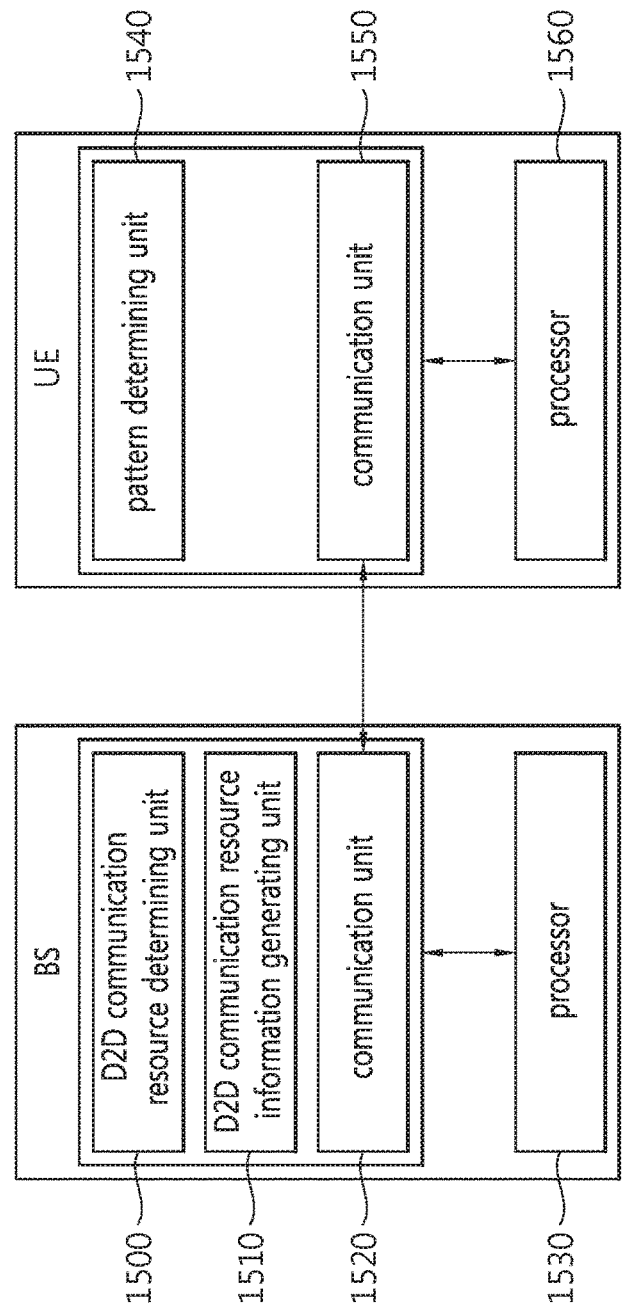

APPARATUS AND METHOD FOR TRANSMITTING D2D DATA BASED ON RESOURCE PATTERN

CROSS-REFERENCE TO RELATED APPLICATIONS

This application is continuation of U.S. application Ser. No. 14/820,461, filed on Aug. 6, 2015, which is continuation-in-part of U.S. application Ser. No. 14/819,232, filed on Aug. 5, 2015, and claims priority from and the benefit of Korean Patent Application Nos. 10-2014-0102572, filed on Aug. 8, 2014, and 10-2014-0102662, filed on Aug. 8, 2014, all of which are hereby incorporated by reference in their entirety.

BACKGROUND

1. Field

The present disclosure relates to wireless communication, and more particularly, to a method and apparatus for transmitting Device to Device (D2D) data based on a resource pattern.

2. Discussion of the Background

An amount of data transmitted through wireless communication has gradually increased. However, the frequency resources that service providers can provide are limited and have become increasingly saturated, and thus, mobile carriers continuously develop technologies for discovering new frequencies and improving efficient use of frequencies. One of the actively studied technologies to ease the frequency resource shortage and to create a new mobile communication service is Device-to-Device (D2D) communication technology.

D2D communication refers to a technology in which User Equipments (UEs) which are geometrically adjacent to one another, directly transmit and receive information without passing through an infrastructure, such as a base station. In the initial stage, the D2D communication technology was developed and standardized mostly in a non-licensed band such as Wi-Fi, Direct, Bluetooth, which have been already commercialized. However, recently, the development of technologies and standardization for supporting D2D communication in a cellular system that uses a licensed band, are underway. Representatively, the $3^{rd}$ Generation Partnership Project (3GPP), which is a mobile communication standardization association, actively conducts D2D communication technology standardization that is referred to as Proximity-based services (ProSe), which is one of the new technologies included in Long Term Evolution (LTE).

However, for the LTE wireless communication system, a method for using data resources for effectively providing D2D services has not been determined. Therefore, there is desire for a method of using resources for effectively supporting services.

SUMMARY

Exemplary embodiments provide a method and apparatus for transmitting Device to Device (D2D) data based on a resource pattern.

Exemplary embodiments provide a method and apparatus for transmitting device-to-device (D2D) data using a D2D data transmission resource.

An exemplary embodiment provides a method of transmitting device-to-device (D2D) data using a D2D data transmission resource by a user equipment (UE), the method including: receiving, at a UE, configuration information associated with a D2D data transmission resource, the configuration information including information of a D2D data allocation period and being transmitted from an evolved NodeB (eNB); determining, at the UE, a D2D data transmission resource in each D2D data allocation period, the D2D data transmission resource including a pool of subframes; selecting D2D data transmission subframes from among the pool of subframes based on a changed pattern, the changed pattern being derived from a basic pattern; and transmitting, from the UE to another UE, D2D data based on the selected D2D data transmission subframes.

An exemplary embodiment provides a user equipment (UE) to transmit device-to-device (D2D) data using a D2D data transmission resource, including: a wireless transceiver configured to: receive configuration information associated with a D2D data transmission resource, the configuration information including information of a D2D data allocation period and being transmitted from an evolved NodeB (eNB); and one or more processors configured to: determine a D2D data transmission resource in each D2D data allocation period, the D2D data transmission resource including a pool of subframes; and select D2D data transmission subframes from among the pool of subframes based on a changed pattern, the changed pattern being derived from a basic pattern. The wireless transceiver transmits, from the UE to another UE, D2D data based on the selected D2D data transmission subframes.

An exemplary embodiment provides a method of transmitting device-to-device (D2D) data using a D2D data transmission resource by a user equipment (UE), the method including: receiving, at a UE, configuration information associated with a D2D data transmission resource, the configuration information being transmitted from an evolved NodeB (eNB); determining, at the UE, a D2D data transmission resource, the D2D data transmission resource including a pool of subframes; and selecting D2D data transmission subframes from among the pool of subframes based on a changed pattern, the changed pattern being determined based on (R mod X), wherein R corresponds to the number of subframes in the pool of subframes and X corresponds to a length of a basic pattern, where R and X are natural numbers; and transmitting, from the UE to another UE, D2D data based on the selected D2D data transmission subframes. A length of the changed pattern corresponds to R.

A collision or interference between User Equipments (UEs) caused by transmission and/or reception of Device-to-Device (D2D) data may be reduced or minimized based on assignment of D2D data resources used for D2D communication. Therefore, the performance of the D2D data transmission may be improved.

BRIEF DESCRIPTION OF THE DRAWINGS

FIG. 8 is a conceptual diagram illustrating a basic pattern according to an exemplary embodiment.

FIG. 9 is a table illustrating a basic pattern according to an exemplary embodiment.

FIG. 10 is a table illustrating a basic pattern according to an exemplary embodiment.

FIG. 15 is a block diagram illustrating a base station and a user equipment according to an exemplary embodiment.

DETAILED DESCRIPTION OF THE ILLUSTRATED EMBODIMENTS

Figure 1:
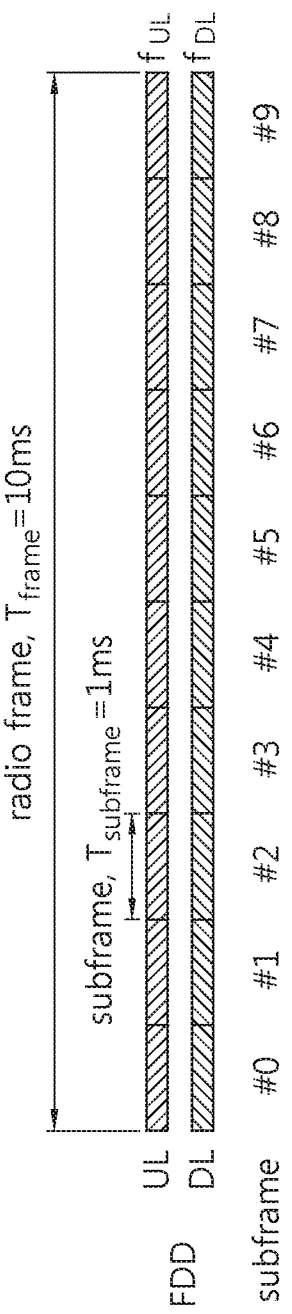
FIG. 1 is a conceptual diagram illustrating a structure of a radio frame according to an exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

FIG. 1 is a conceptual diagram illustrating a structure of a radio frame according to an exemplary embodiment.

FIG. 1 illustrates a structure of a radio frame for Frequency Division Duplexing (FDD)-based Device-to-Device (D2D) communication.

Figure 2:
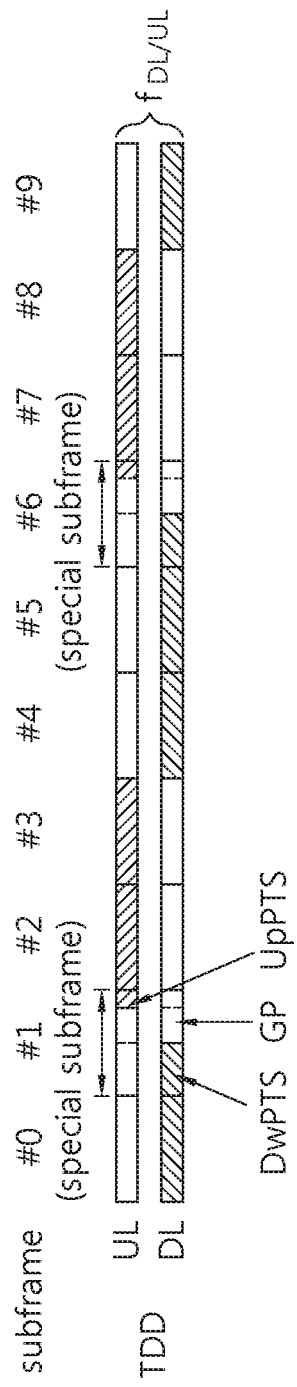
FIG. 2 is a conceptual diagram illustrating a structure of a radio frame according to an exemplary embodiment.

Referring to FIG. 1, a radio frame may include ten subframes. A single subframe includes two slots. A time (a length) in which a single subframe is transmitted is referred to as a Transmission Time Interval (TTI). Referring to FIG. 2, for example, a length of a single subframe (1 subframe) may be 1 ms, and a length of a single slot (1 slot) may be 0.5 ms.

A single slot may include a plurality of symbols in a time domain. For example, in a wireless system that uses Orthogonal Frequency Division Multiple Access (OFDMA) in a Downlink (DL), the symbol may be an Orthogonal Frequency Division Multiplexing (OFDM) symbol and in a wireless system that uses Single Carrier-Frequency Division Multiple Access (SC-FDMA) in an Uplink (UL), the symbol may be an SC-FDMA symbol. An expression associated with a symbol period of the time domain may not be limited by a multiple access scheme or name.

The number of symbols included in a single slot may be different based on a length of a Cyclic Prefix (CP). For example, in the case of a normal CP, seven symbols are included in a single slot, and in the case of an extended CP, six symbols are included in a single slot.

For FDD, when two component carrier frequencies exist, the two component carrier frequencies may be used for uplink transmission and downlink transmission, respectively. Hereinafter, from the perspective of a single D2D User Equipment (UE) (hereinafter referred to as a UE) that supports predetermined D2D communication, uplink transmission refers to data transmission from the UE to another UE or to a Base Station (BS), and uplink data refers to data transmitted from the UE to the other UE or the BS. Also, from the perspective of the UE, downlink transmission refers to data transmission from another UE or a BS to the UE, and downlink data refers to data transmitted from the other UE or the BS to the UE.

For duplexing scheme-based FDD, downlink transmission and uplink transmission may be executed in a cell, in parallel. Although uplink transmission and downlink transmission are parallelly executable in a single cell in FDD, downlink transmission and uplink transmission may not be executed in parallel, depending on whether a UE supports full duplex or half duplex. For example, when a UE operates as a full-duplex mode, the UE may receive downlink data and may transmit uplink data, in parallel. However, when the UE operates as a half-duplex mode, the UE may not simultaneously execute reception of downlink data and transmission of uplink data.

In D2D communication, when a UE operates as a full-duplex mode, the UE may receive downlink data from another UE or a BS, and may transmit uplink data to another UE or the BS, in parallel. However, when the UE operates as a half-duplex mode, the UE may not parallelly execute reception of downlink data from another UE or a BS, and transmission of uplink data to another UE or the BS.

FIG. 2 is a conceptual diagram illustrating a structure of a radio frame according to an exemplary embodiment.

FIG. 2 illustrates a structure of a radio frame for Time Division Duplexing (FDD)-based D2D communication.

Referring to FIG. 2, a radio frame structure for the TDD may include 10 subframes, like the radio frame structure of the FDD. A single subframe includes two slots. Basically, the radio frame structures are similar. However, a predetermined subframe among subframes included in the radio frames of the TDD may be defined as a special subframe. The special subframe may be a time resource for switching uplink transmission and downlink reception. The special subframe may be formed of a downlink part (DwPTS), a Guard Period (GP), and an uplink part (UpPTS).

In TDD, only a single carrier frequency exists, and thus, uplink transmission and downlink transmission may be distinguished based on time in a single cell. For example, on a single carrier frequency, a UE that executes D2D communication, transmits uplink data to another UE or a BS in a time resource for uplink transmission and receives downlink data from another UE or the BS in a time resource for downlink transmission.

Figure 3:
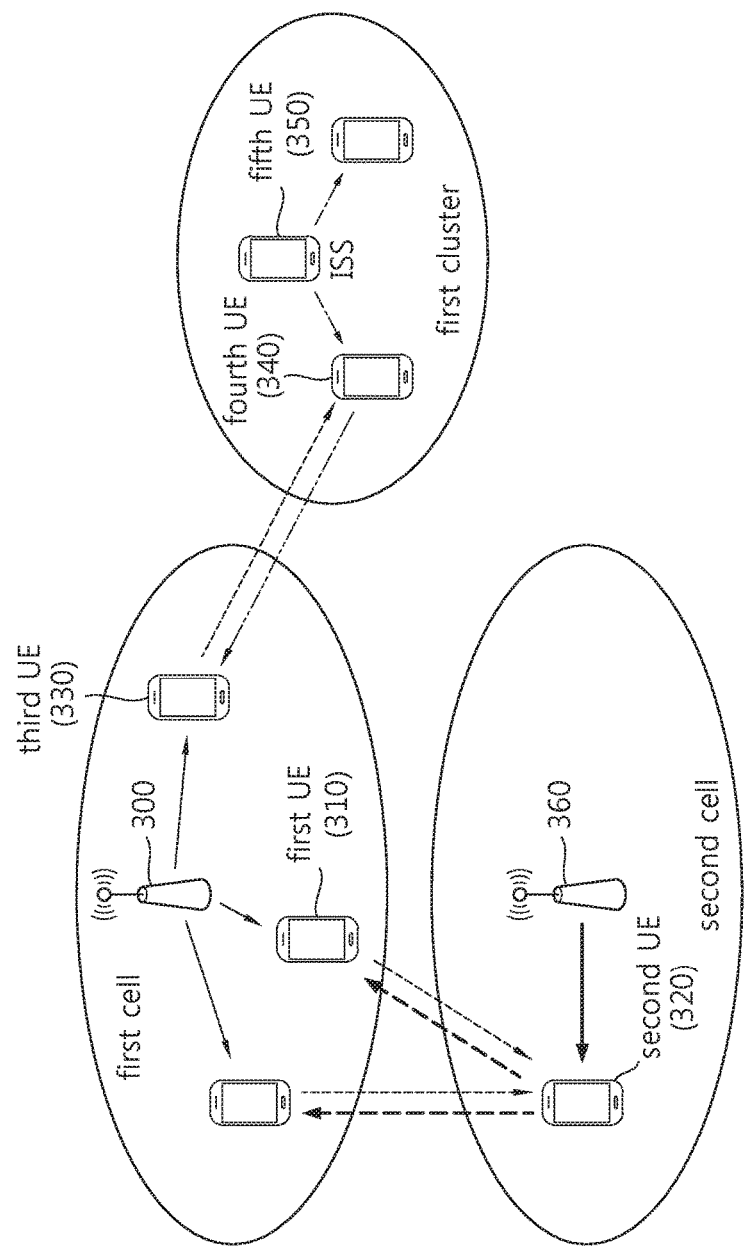
FIG. 3 is a conceptual diagram illustrating D2D communication according to an exemplary embodiment.

FIG. 3 is a conceptual diagram illustrating D2D communication according to an exemplary embodiment.

D2D communication refers to a technology in which UEs directly receive and transmit data. Hereinafter, a UE disclosed in exemplary embodiments is assumed to support D2D communication.

When UEs located close to one another execute D2D communication in a cellular system, loads on an evolved NodeB (eNodeB) may be dispersed. In addition, when UEs execute D2D communication, a UE transmits data a relatively short distance, and thus, transmission power consumption and transmission latency of the UE may decrease. In addition, from the perspective of the whole system, the existing cellular-based communication and the D2D communication use identical resources, and thus, frequency utilization efficiency may be improved.

The D2D communication may be classified into a communication method of a UE located within a network coverage (base station coverage) and a communication method of a UE located outside a network coverage (base station coverage).

Referring to FIG. 3, the communication between a first UE 310 located in a first cell and a second UE 320 located in a second cell may be D2D communication between a UE included in a network coverage and a UE included in a network coverage. The communication between a fourth UE 340 located in the first cluster and a fifth UE 350 located in the first cluster may be D2D communication between the UEs located outside a network coverage. The fifth UE 350 is the cluster header, and the cluster header may operate as an independent Synchronization Source (ISS) for synchronization of an out-of coverage UE.

The D2D communication may include a discovery process that executes discovery for communication between UEs and a direct communication process in which UEs transmit and receive control data and/or traffic data.

The D2D communication may be used for various purposes. For example, D2D communication within a network coverage and D2D communication outside a network coverage may be used for public safety. The D2D communication outside a network coverage may be used for only the public safety. D2D communication in a BS coverage may be executed based on a BS. For example, a BS 300 may transmit D2D resource allocation information to the first UE 310 located in the BS coverage. The D2D resource allocation information may include allocation information associated with a D2D communication resource for D2D communication between the first UE 310 and another UE (for example, a second UE 320). The first UE 310 that receives the D2D resource allocation information from the BS, may transmit the D2D resource allocation information to the second UE 320 outside the BS coverage. The second UE 320 may be a UE located outside the BS coverage, from the perspective of the BS 300 of a first cell. The first UE 310 and the second UE 320 may execute D2D communication based on the D2D resource allocation information. Particularly, the second UE 320 may obtain information associated with the D2D communication resource of the first UE 310. The second UE 320 may receive traffic data and/or control data transmitted from the first UE 310, through a resource indicated by the information associated with the D2D communication resource of the first UE 310.

In the D2D communication, a UE may transmit control data to another UE. A separate channel (for example, a Physical Uplink Control Channel (PUCCH)) for transmitting control data may not be defined in the D2D communication. When the control channel is not defined in the D2D communication, a UE may use various methods for transmitting control data for D2D communication. In the D2D communication, the control data may be expressed as Scheduling Assignment (SA) information. In the D2D communication, actual traffic data (e.g., data transmitted through shared channel, such as physical sidelink shared channel) distinguished from control data, may be expressed as D2D data.

The D2D communication within network coverage may be expressed as first mode communication, and the D2D communication outside network coverage may be expressed as second mode communication. In the first mode communication, a BS or a relay node schedules accurate information associated with resources for the D2D communication between UEs. Particularly, according to the first mode communication, a BS transmits, to a UE, resource allocation information associated with control data (or SA data) and resource allocation information associated with traffic data (or D2D data).

According to the second mode communication, a UE may directly schedule resources for D2D communication, based on a D2D resource pool. Particularly, in the second mode communication, resource allocation information for transmission of control data and resource allocation information associated with traffic data may be selected by a UE from the D2D resource pool. The D2D resource pool may be pre-configured or semi-statically allocated.

Within the network coverage, the first mode communication or the second mode communication may be used as a D2D communication. Outside the network coverage, the second mode communication may be used as a D2D communication.

A D2D communication resource for transmitting or receiving control data or traffic data for D2D communication, may roughly include a D2D SA resource for transmitting control data and a D2D data resource for transmitting traffic data.

The D2D data resource may be a resource used for transmitting and/or receiving traffic data in D2D communication.

The D2D data resource may be defined based on a subframe unit in a time axis and based on a Resource Block (RB) unit in a frequency axis, but this may not be limited thereto. The D2D data resource may be a candidate resource that may transmit traffic data by a D2D UE. That is, the D2D data resource may be expressed as a D2D data candidate resource or a D2D data transmission opportunity. A UE may transmit traffic data through a part or the entirety of the D2D data resource. The D2D data resource that is actually used by a UE for transmitting traffic data may be expressed as a selected D2D data resource.

The D2D SA resource may be a resource that is used for transmitting and/or receiving control data in D2D communication. In the same manner, the D2D SA resource may be defined based on a subframe unit in a time axis and based on a Resource Block (RB) unit in a frequency axis, but this may not be limited thereto. The D2D SA resource may be a candidate resource that may transmit control data by a D2D UE. That is, the D2D SA resource may be expressed as a D2D SA candidate resource or a D2D SA transmission opportunity. The UE may transmit control data through a part of the D2D SA resource. The D2D SA resource that the UE actually uses for transmitting control data, may be expressed as a selected D2D SA resource.

A selected D2D data resource and a selected D2D SA resource may be defined, respectively, by patterns on the D2D data resource and the D2D SA resource. The pattern associated with the selected D2D data resource and/or the pattern associated with the selected D2D SA resource may be expressed as a Resource Pattern for Transmission (RPT), and particularly, may be expressed as a Time Resource Pattern for Transmission (T-RPT) on the time axis.

A set of D2D data resources may be expressed as a D2D data resource pool, and a set of D2D SA resources may be expressed as a D2D SA resource pool. The D2D resource pool may be used as a concept including the D2D data resource pool and the D2D SA resource pool.

Hereinafter, an exemplary embodiment will disclose a method of defining a D2D data resource in a D2D data allocation period, in detail. Hereinafter, a D2D data resource may be classified into a D2D data transmission resource used for D2D data transmission and a D2D data reception resource used for D2D data reception.

Figure 4:
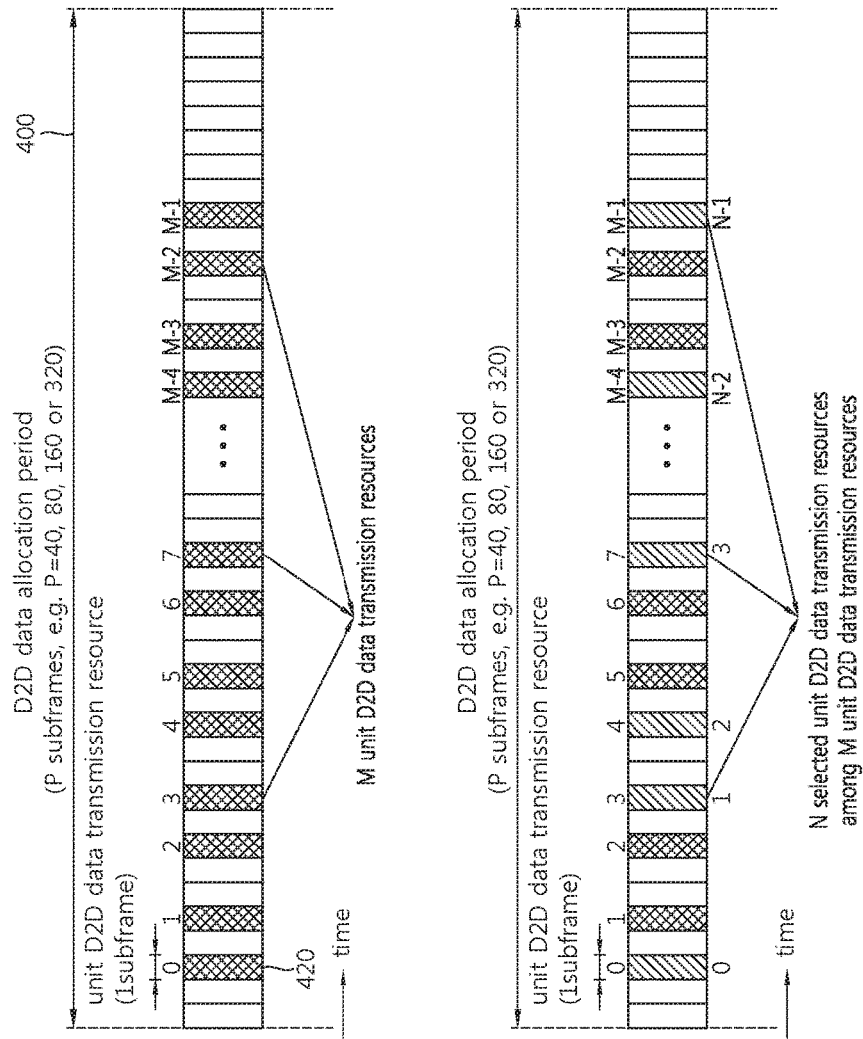
FIG. 4 is a conceptual diagram D2D communication resources according to an exemplary embodiment.

FIG. 4 is a conceptual diagram D2D communication resources according to an exemplary embodiment.

FIG. 4 discloses a D2D data transmission resource defined in a D2D data allocation period.

Referring to FIG. 4, a D2D data allocation period 400 may be a predetermined time unit for allocating D2D data transmission resources. The D2D data allocation period 400 may be a single value defined in advance, or may be a value selected from among a plurality of D2D data allocation period values defined in advance. For example, a D2D data allocation period may be 40 ms, 80 ms, 160 ms, or 320 ms When the D2D data allocation period 400 is executed in subframes, the D2D data allocation period may be 40, 80, 160, or 320 subframe units.

A D2D data transmission resource (or a transmission opportunity) may be defined based on at least one subframe unit within the D2D data allocation period 400. The D2D data transmission resource defined based on at least one subframe unit may be expressed using a term called a unit D2D data transmission resource 420. That is, the D2D data transmission resource defined in the D2D allocation period may be a set of at least one unit D2D data transmission resource 420. The unit D2D data transmission resource 420 may be defined based on a single subframe unit, as illustrated in FIG. 4, and may be defined based on a plurality of subframe units. Hereinafter, descriptions will be provided under an assumption of the case in which the unit D2D data transmission resource 420 is configured based on a single subframe.

A single D2D data transmission unit may be transmitted on the unit D2D data transmission resource 420. The D2D data transmission unit may be a MAC Protocol Data Unit (PDU) in a MAC layer or a data Transport Block (TB) in a physical layer.

A Time-Resource Pattern for Transmission (T-RPT) may be defined based on a D2D data transmission unit. The T-RPT may be a resource pattern defined in a time axis for transmitting a single D2D data transmission unit. The T-RPT may indicate a D2D data transmission resource selected from a plurality of unit D2D data transmission resources, for transmitting a single D2D data transmission unit. When a plurality of selected D2D data transmission resources are selected, a single D2D data transmission unit may be transmitted repeatedly a plurality of times. The T-RPT may be defined based on a basic pattern. The T-RPT and the basic pattern will be described in detail.

Hereinafter, the number of unit D2D data transmission resources allocated within a D2D data allocation period may be defined as a parameter called M. The number of D2D data transmission resources selected from M unit data transmission resources within the D2D data allocation period may be defined as a parameter called N.

Figure 5:
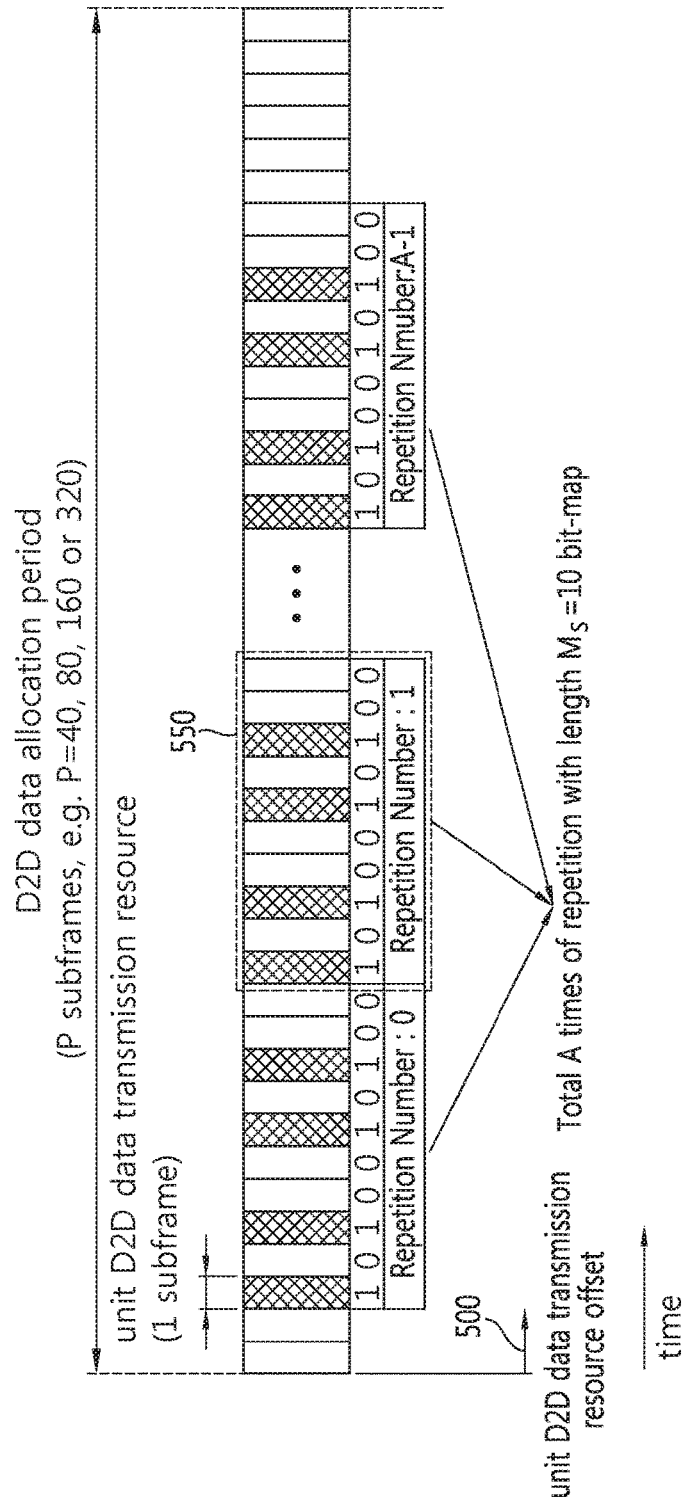
FIG. 5 is a conceptual diagram D2D communication resources according to an exemplary embodiment.

FIG. 5 is a conceptual diagram D2D communication resources according to an exemplary embodiment.

FIG. 5 discloses a method of determining D2D data transmission resources based on D2D data transmission resource bitmap.

According to an exemplary embodiment, the D2D data transmission resource 420 may be allocated by taking into consideration a D2D data transmission resource offset 440 in the D2D data allocation period 400, a D2D data transmission resource bitmap 460, and the number of repetitions 480 of a D2D data resource indication bitmap.

The D2D data transmission resource offset 440 may indicate the allocation location of a first D2D data transmission resource bitmap in the D2D data allocation period. The D2D data transmission resource offset 440 may be a time interval corresponding to N subframes on a time axis. The D2D data transmission resource offset 440 may indicate a starting point of a D2D data transmission resource that is based on a D2D data transmission resource bitmap. Particularly, on subframes after a point indicated as the D2D data transmission resource offset 440, a D2D data transmission resource that is based on the D2D data transmission resource bitmap 460 is repeated as many as the number of repetitions 480 of a D2D data transmission resource bitmap.

The D2D data transmission resource bitmap 460 may be defined on a subframe unit including K subframes, in time axis. The subframe unit that defines the D2D data transmission resource bitmap 460 may be expressed as a bitmap subframe unit.

Bits on the D2D data transmission resource bitmap 460 correspond to subframes included in the bitmap subframe unit, respectively, and the number of subframes included in the bitmap subframe unit may be the length of the D2D data transmission resource bitmap 460. For example, when the number of subframes included in the bitmap subframe unit is K, the length of the D2D data transmission resource bitmap 460 may be K. Although K may be a predetermined value determined by taking into consideration a D2D data resource allocation period among multiples of 8 or multiples of 10, this may not be limited thereto, and various values may be used. For example, when the length of a single radio frame is 10 ms, the length of the D2D data transmission resource bitmap 460 is defined as 10, or may be indicated as a form in which it is repeated in the D2D data allocation period 400. Alternatively, the length of the D2D data transmission resource bitmap 460 may be defined as 5, or may be indicated as a form in which it is repeated in the D2D data allocation period 400. Alternatively, the length of the D2D data transmission resource bitmap 460 may be defined as 20, or may be indicated as a form in which it is repeated in the D2D data allocation period 400.

When the D2D data transmission resource 420 corresponds to a plurality of subframes, bits on the D2D data transmission resource bitmap 460 may correspond to unit D2D data transmission resources (plurality of subframes) included in the bitmap subframe unit, respectively. Hereinafter, an exemplary embodiment will provide descriptions under an assumption that bits of the D2D data transmission resource bitmap 460 correspond to subframes included in a bitmap subframe unit, respectively.

Values of the plurality of bits included in the D2D data transmission resource bitmap 460 may be 0 or 1. When a bit value corresponding to a predetermined subframe of the D2D data transmission resource bitmap 460 is 1, the predetermined subframe may be a D2D data transmission resource. When a bit value corresponding to a predetermined subframe of the D2D data transmission resource bitmap 460 is 0, the predetermined subframe may be a non-D2D data transmission resource. Conversely, when a bit value corresponding to a predetermined subframe on the D2D data transmission resource bitmap 460 is 0, the predetermined subframe may be a D2D data transmission resource, and when a bit value corresponding to a predetermined subframe on the bit map is 1, the predetermined subframe may be a non-D2D data transmission resource.

In FIG. 5, the length K of the D2D data transmission resource bitmap 460 is 10, and the D2D data transmission resource bitmap 460 may be '1010010100.' The bits of the bitmap may sequentially correspond to 10 subframes, respectively, from the most significant bit to the least significant bit. That is, the length of the D2D data transmission resource bitmap 460 may be 10, and the D2D data transmission resource bitmap 460 may indicate, as a D2D data transmission resource, 4 subframes that correspond to a bit value of 1, from among the 10 subframes.

The number of repetitions 480 of a D2D data transmission resource bitmap may be the number of repetitions of a bitmap subframe unit. When the length of the D2D data transmission resource bitmap 460 is K, the number of repetitions R of a bitmap subframe unit on a time axis may be determined as $0 < R \leq \lfloor(P-C)/K\rfloor$. Here, P denotes a D2D data allocation period, and C denotes a D2D data transmission resource offset.

For example, as illustrated in FIG. 4, when the length K of the D2D data transmission resource bitmap 460 is 10 ms, the D2D data resource offset 440 is 2 ms, the D2D data resource allocation period 400 is 160 ms (or 160 subframes), the number of repetitions R 480 of the D2D data transmission resource bitmap may be a value in a range of $0 < R \leq 15$. That is, at most 15 repetitions may be executed. When the number of repetitions of the D2D data transmission resource bitmap is less than 15, a D2D data transmission resource 420 based on the D2D data transmission resource bitmap 460 may be allocated within only a few subframes in the D2D data resource allocation period 400.

As the D2D data allocation period P 400 becomes long, and the D2D data transmission resource offset C 440 and the length K of the D2D data transmission resource bitmap 460 becomes short, the number of repetitions 480 of the D2D data transmission resource bitmap becomes high. By taking into consideration the maximum value of the number of repetitions 480 of the D2D data transmission resource bitmap, a D2D data transmission resource may be allocated in the D2D data allocation period 400. For example, when P=320, C=0, and K=8, $0 < R \leq 40$. In this instance, as the number of repetitions 480 of the D2D data transmission resource bitmap, one out of 1 to 40 may be selected. Based on the selected value corresponding to the number of repetitions 480 of the D2D data transmission resource bitmap, a D2D data transmission resource may be allocated in the D2D data allocation period 400.

Information associated with the D2D data allocation period 400, information associated with the D2D data transmission resource offset 440, information associated with the D2D data transmission resource bitmap 460, and information associated with the number of repetitions 480 of the D2D data transmission resource bitmap may be common information for UEs included in a UE set.

Information for allocating a D2D data transmission resource to an individual UE or a UE group, may be UE-specific information of a UE group-specific information. The information for allocating the D2D data transmission resource 420 to an individual UE or a UE group may be expressed as a term called D2D data transmission resource allocation information.

Figure 6:
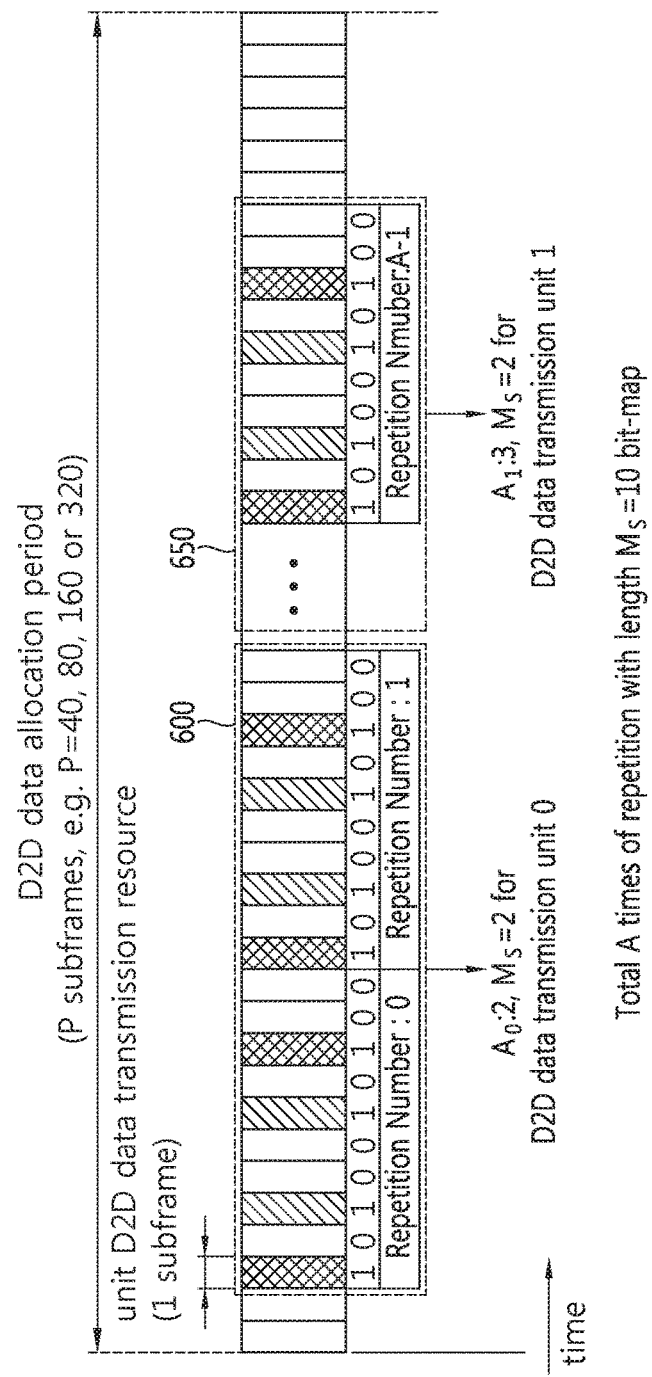
FIG. 6 illustrates a method of determining selected D2D communication resources according to an exemplary embodiment.

FIG. 6 illustrates a method of determining selected D2D communication resources according to an exemplary embodiment.

FIG. 6 discloses a method of transmitting a D2D data transmission unit on a D2D data transmission resource selected from D2D data transmission resources that are based on a D2D data transmission resource bitmap.

M, which is the number of entire unit D2D data transmission resources allocated within the D2D data allocation period, may be a product of the total number A of repetitions of a D2D data transmission resource bitmap and the number of D2D data transmission resources $M_s$ that is based on a single D2D data transmission resource bitmap.

Particularly, the total number A of repetitions of the D2D data transmission resource bitmap may be equal to or less than a sum $(A_0+A_1+ \ldots +A_i+ \ldots +A_{D-1})$ of the number of repetitions of a D2D data transmission resource bitmap for each of D D2D data transmission units, which are transmitted within the D2D data allocation period. The D D2D data transmission units may be D2D data transmission unit 0 to D2D data transmission unit D−1. $A_i$ may indicate the number of repetitions of a D2D data transmission resource bitmap for a D2D data transmission unit i (i is an integer in a range from 0 to D−1). $M_s$ is the number of D2D data transmission resources defined in a single D2D data transmission resource bitmap. Therefore, the number of D2D data transmission resources for each of the D D2D data transmission units may be $A_0 \cdot M_s, A_1 \cdot M_s, \ldots, A_i \cdot M_s, \ldots$, and $A_{D-1} \cdot M_s$.

For example, when K=10, $M_s$=4, and A=15, a D2D data transmission resource bitmap (4 bits out of 10 bits correspond to '1') is repeated 15 times (A=15) within the D2D data resource allocation period and D2D data transmission resources may be determined. In this instance, 60 which is a product of $M_s$ and A may be the number of unit D2D data transmission resources within the D2D data allocation period.

A D2D data transmission unit may be transmitted based on a D2D data transmission resource bitmap-based D2D data transmission resource. In this instance, the D2D data transmission resources for a single D2D data transmission unit may be determined based on at least one D2D data transmission resource bitmap. For example, a predetermined D2D data transmission unit may be transmitted on a one time-repeated D2D data transmission bitmap-based D2D data transmission resource, and another D2D data transmission unit may be transmitted on a plurality of times repeated D2D data transmission resource bitmap units-based D2D data transmission resource.

Particularly, it is assumed that the number of repetitions of the D2D data transmission resource bitmap is 5 (A=5), and D2D data transmission unit 0 and D2D data transmission unit 1 are transmitted within the D2D data resource allocation period. Also, it is assumed that $A_0$ is 2, $A_1$ is 3, and $M_s$=4. In this instance, D2D data transmission unit 0 is transmitted through D2D data transmission resource 0 that is based on two times-repeated D2D data transmission resource bitmaps, and D2D data transmission unit 1 may be transmitted through D2D data transmission resource 1 that is based on three times-repeated D2D data transmission resource bitmaps. The number ($A_0 \cdot M_s$) of D2D data transmission resources corresponding to D2D data transmission resource 0 is 8 and the number ($A_1 \cdot M_s$) of D2D data transmission resources corresponding to D2D data transmission resource 1 is 12.

D2D data transmission unit 0 may be transmitted through a selected data transmission resource 0 out of the D2D data transmission resource 0. In the same manner, D2D data transmission unit 1 may be transmitted through a selected data transmission resource 1 out of D2D data transmission resource 1.

The number of D2D data transmission resources selected for each of the D D2D data transmission units (or the number of times of transmissions of the D2D data transmission unit) may be expressed as $L_0, L_1, \ldots, \ldots,$ and $L_{D-1}$. For example, when $L_0$ is 4, D2D data transmission unit 0 may be transmitted repeatedly four times on four D2D data transmission resources selected out of D2D data transmission resources for the D2D data transmission unit 0.

N selected D2D data transmission resource may be a sum of $L_0, L_1, \ldots, \ldots,$ and $L_{D-1}$ ($N=L_0+L_1+\ldots+L_i+\ldots+L_{D-1}$). For example, $L_0, L_1, \ldots, L_i, \ldots, L_{D-1}$ may be 1, 2, 4, or 8, respectively.

That is, a single D2D data transmission unit may be transmitted on $L_i$ D2D data transmission resources selected out of $A_i \cdot M_s$ D2D data transmission resources.

D2D data transmission resources for transmitting a single D2D data transmission unit and D2D data transmission resources selected out of D2D data transmission resources for transmitting a single D2D data transmission unit may be patternized, and the pattern is a T-RPT.

Figure 7:
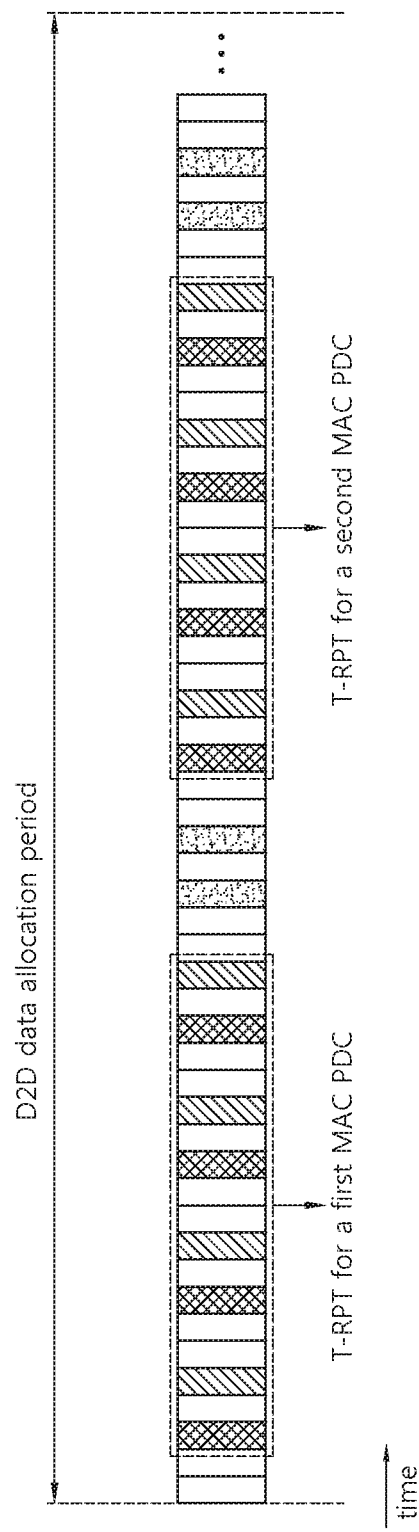
FIG. 7 is a conceptual diagram illustrating a T-RPT according to an exemplary embodiment.

FIG. 7 is a conceptual diagram illustrating a T-RPT according to an exemplary embodiment.

The T-RPT is a pattern of a D2D data transmission resource for transmitting a single D2D data transmission unit and a D2D data transmission resource selected out of a D2D data transmission resource.

According to an exemplary embodiment, the T-RPT may be determined by extending a basic pattern. That is, the T-RPT may include at least one basic pattern.

The basic pattern may indicate Y D2D data transmission resources out of X D2D data transmission resources. That is, X is a parameter indicating the number of D2D data transmission resources defining the basic pattern, and Y is a parameter indicating the number of D2D data transmission resources selected out of D2D data transmission resources for defining the basic pattern.

The basic pattern may be defined based on various X and Y values. Referring to FIG. 7, T-RPT 0 for a first D2D data transmission unit (first MAC PDU in MAC layer, first data TB in physical layer) may be formed of two basic patterns based on X=4 and Y=2 (or a single basic pattern based on X=8 and Y=4), and T-RPT 1 for a second D2D data transmission unit (second MAC PDU in MAC layer, second data TB in physical layer) may be formed of two basic patterns based on X=4 and Y=2 (a single basic pattern based on X=8 and Y=4).

For example, basic pattern 0 and basic pattern 1 may be determined based on X=4 and Y=2. In this instance, the basic pattern may indicate two D2D data transmission resources selected out of 4 D2D data transmission resources by using various combinations based on a hadamard code having a length of 4 (or Walsh code). Alternatively, basic pattern 0 and basic pattern 1 may be determined based on X=8 and Y=4. In this instance, the basic pattern may indicate four D2D data transmission resources selected out of 8 D2D data transmission resources by using various combinations based on a hadamard code having a length of 8 (or Walsh code).

That is, the basic pattern may be determined based on $X=2^m (m \geq 2)$ and $Y=X/2$. In this instance, the basic pattern may indicate Y D2D data transmission resources selected out of X D2D data transmission resources by using one of the various combinations based on a hadamard code having a length of $2^i$. Here, a basic pattern indication bit for indicating information associated with a basic pattern that is used from among various combinations for a basic pattern, may be at least m+1 bits. When the number of bits allocated to the information associated with a basic pattern is limited to a predetermined number of bits (for example, 4 bits or 5 bits), only a few combinations for a basic pattern out of possible basic patterns may be used.

According to an exemplary embodiment, the number of D2D data transmission resources selected from a basic pattern (or the number of repetitions of a D2D data transmission unit) may be a multiple of 2 such as 1, 2, 4, 8, and the like. When the number of selected D2D data transmission resources is configured as one of the various values, flexibility of a D2D communication coverage may be secured.

The number of times of transmissions of a D2D data transmission unit may be more flexibly applied by taking into consideration various communication coverages. For example, in a scenario where many terminals execute D2D communication in a relatively wide communication coverage (for example, D2D communication to cover a broad coverage such as an emergency situation or the like when an ISS is distant from a base station), the scenario may increase the number of times of transmissions of a D2D data transmission unit even though there is overhead associated with D2D communication resources. Conversely, in a scenario where D2D communication is possible with a relatively narrow communication coverage (for example, D2D communication for advertisements with respect to neighboring terminals, such as D2D communication among neighboring terminals and the like), the scenario may reduce the number of times of transmissions of a D2D data transmission unit so as to reduce overhead associated with D2D communication resources. Also, by taking into consideration Voice over Internet Protocol (VoW) and the like, D2D communication may be executed based on the relatively small number of times of transmissions of a D2D data transmission unit.

Hereinafter, an exemplary embodiment discloses various basic patterns.

FIG. 8 is a table illustrating a basic pattern according to an exemplary embodiment.

FIG. 8 discloses a basic pattern of X=4 and Y=2, determined based on a hadamard code having a length of 4. The basic pattern may be expressed as a term, (4, 2) basic pattern.

Referring to FIG. 8, in the table associated with a hadamard code-based basic pattern, '1' may indicate a selected D2D data transmission resource. Also, '−1' may indicate a D2D data transmission resource through which a D2D data transmission unit is not transmitted.

According to an exemplary embodiment, six (4, 2) basic patterns may be determined based on hadamard codes excluding a few codes that do not satisfy X=4 and Y=2 from the hadamard codes having a length of 4. Each of the six (4, 2) basic patterns may be indicated as (4, 2) basic pattern 0 to (4, 2) basic pattern 5.

(4, 2) basic pattern 0 to (4, 2) basic pattern 2 from among the six (4, 2) basic patterns, may be defined based on the hadamard codes having a length of 4. (4, 2) basic pattern 3 to (4, 2) basic pattern 5 from among the six (4, 2) basic patterns, may be defined based on codes determined by multiplying −1 and each code value of the hadamard codes having a length of 4.

At least 3 bits may be required to indicate a predetermined (4, 2) basic pattern from among the six (4, 2) basic patterns. The bits for indicating a basic pattern may be referred to as a basic pattern indication bit. A single T-RPT may include at least one basic pattern. For example, one T-TRP may be configured based on one or multiple times of repetitions of a predetermined basic pattern out of (4, 2) basic patterns.

FIG. 9 is a table illustrating a basic pattern according to an exemplary embodiment.

FIG. 9 discloses a basic pattern of X=8 and Y=4, determined based on a hadamard code having a length of 8. The basic pattern may be expressed as a term, (8, 4) basic pattern.

Referring to FIG. 9, fourteen (8, 4) basic patterns may be determined based on hadamard codes excluding a few codes that do not satisfy X=8 and Y=4 from the hadamard codes having a length of 8. Each of the fourteen (8, 4) basic patterns may be indicated as (8, 4) basic pattern 0 to (8, 4) basic pattern 13.

(8, 4) basic pattern 0 to (8, 4) basic pattern 6 from among the fourteen (8, 4) basic patterns, may be defined based on the hadamard codes having a length of 8. (8, 4) basic pattern 7 to (8, 4) basic pattern 13 from among the fourteen (8, 4) basic patterns, may be defined based on codes determined by multiplying −1 and each code value of the hadamard codes having a length of 8.

A basic pattern indication bit for indicating fourteen basic patterns may be at least 4 bits. A single T-RPT may include at least one basic pattern. For example, one T-TRP may be configured based on one or multiple times of repetitions of a predetermined basic pattern out of (8, 4) basic patterns.

Figure 10:
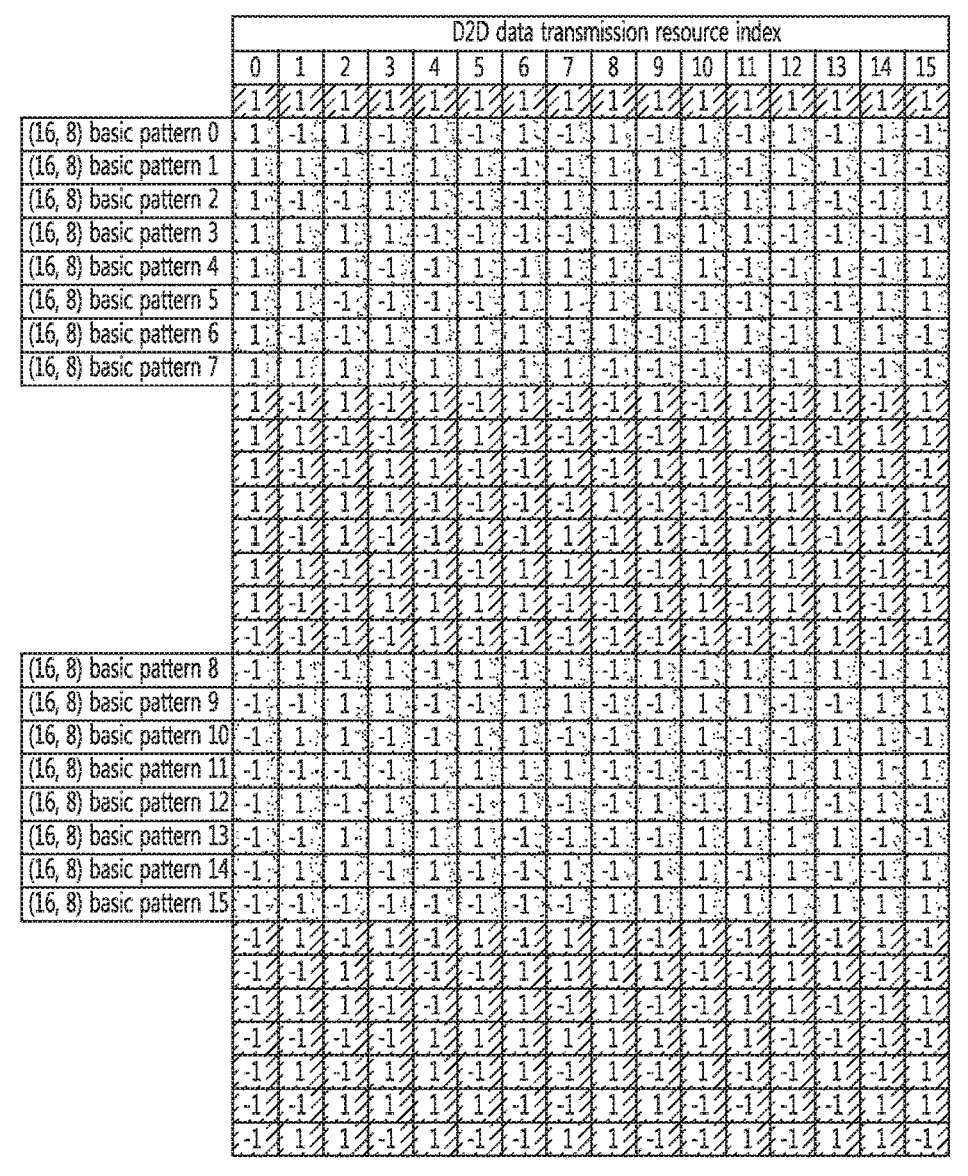

FIG. 10 is a table illustrating a basic pattern according to an exemplary embodiment.

FIG. 10 discloses a basic pattern of X=16 and Y=8, determined based on a hadamard code having a length of 16. The basic pattern may be expressed as a term, (16, 8) basic pattern.

Referring to FIG. 10, 30 (16, 8) basic patterns may be determined based on hadamard codes excluding a few codes that do not satisfy X=16 and Y=8 from the hadamard codes having a length of 16. 16 basic patterns may be defined by taking into consideration a basic pattern indication bit of 4 bits. (16, 8) basic pattern 0 to (16, 8) basic pattern 7 from among the sixteen (16, 8) basic patterns, may be defined based on the hadamard codes having a length of 16. For example, (16, 8) basic pattern 0 to (16, 8) basic pattern 7 may be determined based on a total of 8 default hadamard codes from a second hadamard code, excluding a first hadamard code formed of only '+1' from the default hadamard codes having a length of 16. Among sixteen (16, 8) basic patterns, the remaining (16, 8) basic pattern 8 to (16, 8) basic pattern 15 may be determined based on codes determined by multiplying −1 and each code value of the hadamard codes corresponding to (16, 8) basic pattern 0 to (16, 8) basic pattern 7.

In the same manner, a single T-RPT may include at least one basic pattern. For example, one T-TRP may be configured based on one or multiple times of repetitions of a predetermined basic pattern out of (16, 8) basic patterns.

A basic pattern determined based on a hadamard code disclosed in FIGS. 8 to 10, may be generalized and may be expressed as follows.

A basic pattern of $X=2^m$ and $Y=X/2$, determined based on a hadamard code having a length of $2^m$, may be generated. The basic pattern may be expressed as a term, $(2^m, 2^{m-1})$ basic pattern.

The number of possible basic patterns for a T-RPT, which is based on a hadamard code having a length of $2^m$, may be determined as follows.

In the case of a hadamard code having a length of $2^m$, $2^m$ hadamard codes may exist. When a first hadamard code formed of code values of only '1' is excluded from $2^m$ hadamard codes, $2^{m-1}$ hadamard codes may be used for determining a basic pattern. Also, a code obtained by multiplying −1 and a hadamard code may be used for determining a basic pattern.

Therefore, when a hadamard code having a length of $2^m$ is used, the number of possible basic patterns for a T-RPT may be $2 \cdot (2^{m-1}) = 2^{m+1} - 2$. That is, when a hadamard code having a length of $2^m$ is used, the number of possible basic patterns for a T-RPT may be $2^{m+1} - 2$.

For example, when a hadamard code having a length of 4 with m=2 is used, the number of basic patterns may be 6, when a hadamard code having a length of 8 with m=3 is used, the number of basic patterns may be 14, when a hadamard code having a length of 16 with m=4 is used, the number of basic patterns may be 30, when a hadamard code having a length of 32 with m=5 is used, the number of basic patterns may be 62, and when a hadamard code having a length of 64 with m=6 is used, the number of basic patterns may be 126.

A basic pattern indication bit for indicating one of the plurality of basic patterns that are based on a hadamard code having a length of $2^m$, may be at least m+1 bit. When the number of bits for a basic pattern indication bit is limited, only a few basic patterns may be used from among possible basic patterns that are based on a hadamard code having a length of $2^m$. For example, when the basic pattern indication bit is limited to 4 bits, basic patterns based on a maximum of 16 hadamard codes may be used. When the basic pattern indication bit is limited to 5 bits, basic patterns based on a maximum of 32 hadamard codes may be used.

When the basic pattern indication bit is limited to 4 bits, six (4, 2) basic patterns and fourteen (8, 4) basic patterns may be indicated based on the basic pattern indication bit. Also, when the basic pattern indication bit is limited to 4 bits, sixteen (16, 8) basic patterns out of 30 possible (16, 8) basic patterns disclosed in FIG. 10 may be indicated.

The number M of unit D2D data transmission resources within a D2D data resource allocation period and the number N of selected D2D data transmission resources are fixed, D2D data transmission resources and selected D2D data transmission resources may be allocated based on at least one basic pattern defined in advance, as described in FIGS. 8 to 10. For example, when M=32 and N=16, a basic pattern may be configured based on X=8 and Y=4.

However, M may have full flexibility using a bitmap or the like. N may also be variable based on the number of repetitions of a single D2D data transmission unit and the number of different D2D data transmission resources transmitted within a D2D data resource allocation period.

When M and N are variable, and D2D data transmission resources and selected D2D data transmission resources are allocated based on a predetermined basic pattern, the use of D2D communication resource may be inefficient. Therefore, a basic pattern may need to be configured variably. When the basic pattern is variable, overhead of a signaling for signaling a changed basic pattern may occur.

Therefore, there is desire for a method for supporting variable M or N without overhead for signaling a changed pattern.

Hereinafter, in an exemplary embodiment, (X, Y) that is increased by repetitions of a basic pattern may be expressed as (Xrep, Yrep), (X, Y) that is decreased by using a part of a basic pattern may be expressed as (Xred, Yred), and (X, Y) of a finally changed pattern may be expressed as a parameter (Xnew, Ynew).

The term, D2D data transmission resources (Xrep) and selected D2D data transmission resources (Yrep), may be used for indicating D2D data transmission resources and selected D2D data transmission resources, which are extended by repeating a basic pattern.

The term, D2D data transmission resources (Xred) and selected D2D data transmission resources (Yred), may be used for indicating D2D data transmission resources and selected D2D data transmission resources, which are reduced by reduction of a basic pattern.

The term, D2D data transmission resources (Xnew) and selected D2D data transmission resources (Ynew), may be used for indicating D2D data transmission resources and selected D2D data transmission resources, which are indicated based on a changed pattern.

Hereinafter, a changed pattern of a basic pattern for supporting a variable M and/or N is disclosed. The case in which $L_i$ D2D data transmission resources out of $A_i \cdot M_s$ D2D data transmission resources are actually used for transmitting a single D2D data transmission unit, may be considered.

A changed pattern may be determined, by excluding the case of $X > A_i \cdot M_s$. A basic pattern may be determined to enable X to be less than or equal to $A_1 \cdot M_s$.

Figure 11:
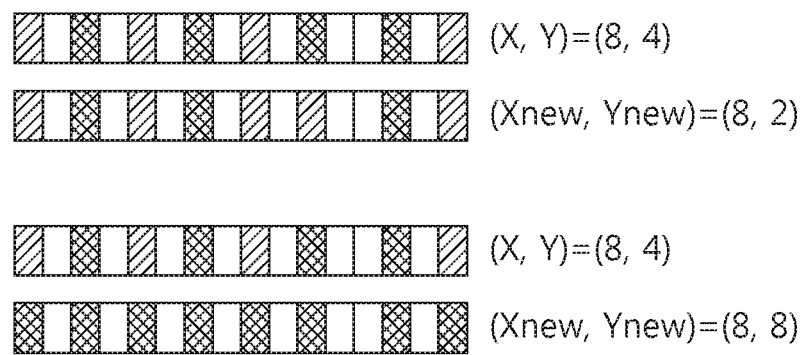
FIG. 11 is a conceptual diagram illustrating a method of generating a changed pattern based on a basic pattern according to an exemplary embodiment.

FIG. 11 is a conceptual diagram illustrating a method of generating a changed pattern, based on a basic patter according to an exemplary embodiment.

FIG. 11 discloses a changed pattern that is generated based on a basic pattern, for supporting variable M and/or N, when $X = A_i \cdot M_s$.

When $X = Ai \cdot Ms$, a changed pattern may be determined by comparing sizes between Y and $L_i$. For example, the case $X=8$ and $A_i \cdot M_s=8$ may be assumed.

$$Y > L_i \qquad 1)$$

The upper diagram of FIG. 11 discloses a method of generating a changed pattern when Y>Li.

When $Y > L_i$, only $L_i$ selected D2D data transmission resources which are temporally earlier may be determined as selected D2D data transmission resources (Ynew) of a changed pattern. Actual traffic transmission may not be executed in the remaining $Y-L_i$ selected D2D data transmission resources.

Particularly, when Y=4 and $L_i$=2, only first two selected D2D data transmission resources of the basic pattern may be determined as selected D2D data transmission resources (Ynew) of the changed pattern. Data may not be transmitted in the remaining two selected D2D data transmission resources.

$$Y = L_i \qquad 2)$$

A UE may not determine a changed pattern separately, and may transmit data based on the basic pattern.

For example, when Y=4 and $L_i$=4, the UE may transmit data through selected D2D data transmission resources that are based on the basic pattern set in advance.

$$Y < L_i \qquad 3)$$

The lower diagram of FIG. 11 discloses a method of generating a changed pattern when $Y < L_i$.

X-Y D2D data transmission resources remaining after excluding Y selected D2D data transmission resources from X D2D data transmission resources may be determined as selected D2D data transmission resources (Ynew) of a changed pattern.

Particularly, at least one D2D data transmission resource out of the X-Y remaining D2D data transmission resources may be determined as a selected D2D data transmission resource (Ynew) of a changed pattern. Remaining D2D data transmission resources that are temporally earlier out of the X-Y remaining D2D data transmission resources may be preferentially determined as selected D2D data transmission resources (Ynew) of the changed pattern. In the changed pattern, the number of selected D2D data transmission resources (Ynew) selected based on the addition of selected D2D data transmission resources, as described above, may be $L_i$.

For example, the case X=4 and L=8 may be assumed. A (8, 4) basic pattern forming a T-RPT may indicate four selected D2D data transmission resources out of 8 D2D data transmission resources. In this instance, a UE may transmit data based on a changed pattern in which all of the 8 D2D data transmission resources of the basic pattern are set as selected D2D data transmission resources (Ynew).

Figure 12:
FIG. 12 is a conceptual diagram illustrating a method of generating a changed pattern based on a basic pattern according to an exemplary embodiment.
Figure 12:
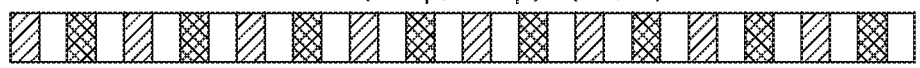
Figure 12:
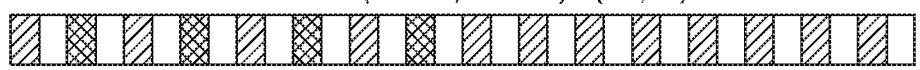
Figure 12:
Figure 12:
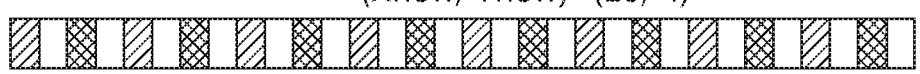
Figure 12:
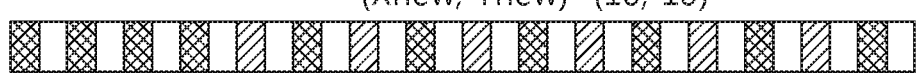

FIG. 12 is a conceptual diagram illustrating a method of generating a changed pattern based on a basic pattern according to an exemplary embodiment.

FIG. 12 discloses a changed pattern that is generated based on a basic pattern for supporting variable M and/or N, when $X < A_i \cdot M_s$.

When $X < A_i \cdot M_s$, a changed pattern may be determined by comparing sizes between Y and $L_i$.

When $X < A_i \cdot M_s$, a basic pattern may be repeated as many as $\lceil (A_i \cdot M_s)/X \rceil$ times. A length Xrep of $\lceil (A_i \cdot M_s)/X \rceil$ times-repeated basic patterns may be greater than or equal to $A_i \cdot M_s$.

For example, when X=8 and $A_i \cdot M_s$=16, the basic pattern may be repeated two times. As another example, when X=8 and $A_i \cdot M_s$=20, the basic pattern may be repeated three times. By repeating the basic pattern three times, eight D2D data transmission resources may be extended to 24 D2D data transmission resources (Xrep). The changed pattern may be defined in 20 D2D data transmission resources (Xnew) which are temporally earlier out of the 24 D2D data transmission resources (Xrep). When the basic pattern is repeated, the selected D2D data transmission resources may be extended to selected D2D data transmission resources (rep).

For example, the case of X=8, Y=4, and $A_i \cdot M_s$=16 may be assumed. When a changed pattern is configured by repeating the basic pattern two times, Yrep may be 8. As another example, when X=8, Y=4, and $A_i \cdot M_s$=20, the basic pattern may be repeated three times. An application range of three-times repeated basic patterns may be extended to 24 (=Xrep) D2D data transmission resources (Xrep). The changed pattern may be defined in only first 20 D2D data transmission resources (Xnew) out of the 24 D2D data transmission resources. The selected D2D data transmission resources may also be extended to selected D2D data transmission resources (Yrep), by repeating the basic pattern. Yrep is a value greater than Y.

The selected D2D data transmission resources (Ynew) of the changed pattern may be determined by comparing the size between Yrep determined based on repetition of the basic pattern and $L_i$.

$$Yrep > L_i \qquad 1)$$

FIG. 12 illustrates a method of determining selected D2D data transmission resources on a changed pattern when Yrep>$L_i$.

When Yrep>$L_i$, selected D2D data transmission resources (Ynew) may be set in only $L_i$ selected D2D data transmission resources that are temporally earlier from among selected D2D data transmission resources (Yrep). Actual data transmission may not be executed in the Yrep-L remaining selected D2D data transmission resources. That is, only a few of selected D2D data transmission resources out of the D2D data transmission resources selected to satisfy Ynew=$L_i$, may be used for data transmission.

For example, when Yrep=8 and $L_i$=4, only four selected D2D data transmission resources that are temporally earlier from among eight selected D2D data transmission resources (Yrep) may be determined as selected D2D data transmission resources (Ynew). Data may not be transmitted in the four remaining selected D2D data transmission resources. That is, a UE may disregard the four remaining selected D2D data transmission resources, and may not transmit data.

$$Yrep=L_i \qquad (2)$$

When Yrep=Li, changing a pattern may not be separately needed. The UE may transmit data through the selected D2D data transmission resources (Yrep).

$$Yrep<L_i \qquad (3)$$

The lower diagram of FIG. 12 illustrates a method of determining selected D2D data transmission resources (Ynew) of a changed pattern when Yrep<Li.

In addition to the selected D2D data transmission resources (Yrep), at least one of the D2D data transmission resources remaining after excluding the selected D2D data transmission resources (Yrep) may be additionally determined to be selected D2D data transmission resources (Ynew).

Particularly, at least one D2D data transmission resource out of the Xnew-Yrep remaining D2D data transmission resources may be additionally determined to be selected D2D data transmission resources (Ynew). Remaining D2D data transmission resources that are temporally earlier may be determined to be selected D2D data transmission resources (Ynew). Based on the additional determination, the number of selected D2D data transmission resources (Ynew) of the changed pattern may be $L_i$.

For example, when Xnew=20, Ynew=8, and $L_i$=16, a UE may additionally determine eight D2D data transmission resources that are temporally earlier as the selected data transmission resources (Ynew). That is, selected D2D data transmission resources (Yrep) and eight D2D data transmission resources that are different from the selected D2D data transmission resources may be set to be the selected D2D data transmission resources (Ynew).

Hereinafter, a method of generating a changed pattern based on a basic pattern with X=4 and Y=2

Table 1 provided below shows a (4, 2) basic pattern based on Hadamard code.

TABLE 1

|  | $1^{st}$ unit D2D data transmission resource | $2^{nd}$ unit D2D data transmission resource | $3^{rd}$ unit D2D data transmission resource | $4^{th}$ unit D2D data transmission resource |
| --- | --- | --- | --- | --- |
| (4, 2) basic pattern 0 | +1 | −1 | +1 | −1 |
| (4, 2) basic pattern 1 | +1 | +1 | −1 | −1 |

TABLE 1-continued

|  | $1^{st}$ unit D2D data transmission resource | $2^{nd}$ unit D2D data transmission resource | $3^{rd}$ unit D2D data transmission resource | $4^{th}$ unit D2D data transmission resource |
| --- | --- | --- | --- | --- |
| (4, 2) basic pattern 2 | +1 | −1 | −1 | +1 |
| (4, 2) basic pattern 3 | −1 | +1 | −1 | +1 |
| (4, 2) basic pattern 4 | −1 | −1 | +1 | +1 |
| (4, 2) basic pattern 5 | −1 | +1 | +1 | −1 |

(4, 2) basic patterns of Table 1 are identical to (4, 2) basic patterns disclosed in FIG. 8.

In this instance, the following cases of $L_i$ will be considered. In this instance, $A_i \cdot M_s$ may be a multiple of 4.

$$L_i=1 \text{(in this instance, } A_i \cdot M_s=4) \qquad 1)$$

According to the above mentioned method, (Xnew, Ynew)=(4,1) may be generated from (X, Y)=(4, 2). That is, except for a first selected D2D data transmission resource in each (4, 2) basic pattern of Table 1, the remaining D2D data transmission resources may not be the selected D2D data transmission resource, irrespective of a code value of the (4, 2) basic pattern. This may be expressed by Table 2.

Alternatively, Table 3 may be used, in which a pattern of first two unit D2D data transmission resources is identical to (2, 1) pattern. That is, according to Table 3, with respect to four unit D2D data transmission resources ($A_i \cdot M_s$=4), the (2, 1) pattern of Table 4 may be applied to first two unit D2D data transmission resources, and D2D data is not transmitted through the remaining two unit D2D transmission resources.

TABLE 2

|  | $1^{st}$ unit D2D data transmission resource | $2^{nd}$ unit D2D data transmission resource | $3^{th}$ unit D2D data transmission resource | $4^{th}$ unit D2D data transmission resource |
| --- | --- | --- | --- | --- |
| (4, 1) basic pattern 0 | +1 | −1 | −1 | −1 |
| (4, 1) basic pattern 1 | +1 | −1 | −1 | −1 |
| (4, 1) basic pattern 2 | +1 | −1 | −1 | −1 |
| (4, 1) basic pattern 3 | −1 | +1 | −1 | −1 |
| (4, 1) basic pattern 4 | −1 | −1 | +1 | −1 |
| (4, 1) basic pattern 5 | −1 | +1 | −1 | −1 |

TABLE 3

|  | $1^{st}$ unit D2D data transmission resource | $2^{nd}$ unit D2D data transmission resource | $3^{rd}$ unit D2D data transmission resource | $4^{th}$ unit D2D data transmission resource |
| --- | --- | --- | --- | --- |
| (4, 1) basic pattern 0 | +1 | −1 | −1 | −1 |
| (4, 1) basic pattern 1 | −1 | +1 | −1 | −1 |

TABLE 4

|  | 1st unit D2D data transmission resource | 2nd unit D2D data transmission resource |
|---|---|---|
| (2, 1) basic pattern 0 | +1 | −1 |
| (2, 1) basic pattern 1 | −1 | +1 |

$$L_i=2 \text{(in this instance, } A_i \cdot M_s=4) \quad \quad 2)$$

According to the above mentioned method, (Xnew, Ynew)=(4, 2) may be generated from (X, Y)=(4, 2). That is, Table 1 may be applied, as it is, with respect to four unit D2D data transmission resources ($A_i \cdot M_s$=4).

$$L_i=4 \text{(in this instance, } A_i \cdot M_s=8) \quad \quad 3)$$

According to the above mentioned method, (Xnew, Ynew)=(8, 4) may be generated from (X, Y)=(4, 2). That is, (Xnew, Ynew)=(8, 4) may be generated from (Xrep, Yrep) =(8,4), which is obtained by repeating (X, Y)=(4, 2) two times. That is, with respect to eight unit D2D data transmission resources ($A_i \cdot M_s$=8), Table 1 may be applied as it is, with respect to first four unit D2D data transmission resources, and Table 1 may be applied repeatedly with respect to the remaining four unit D2D data transmission resources.

$$L_i=8 \text{(in this instance, } A_i \cdot M_s=16) \quad \quad 4)$$

According to the above mentioned method, (Xnew, Ynew)=(16, 8) may be generated from (X, Y)=(4, 2). That is, (Xnew, Ynew)=(16, 8) may be generated from (Xrep, Yrep)=(16, 8), which is obtained by repeating (X, Y)=(4, 2) four times. That is, with respect to 16 unit D2D data transmission resources ($A_i \cdot M_s$=16), Table 1 may be applied as it is with respect to first four unit D2D data transmission resources, Table 1 is repeatedly applied with respect to subsequent four unit D2D data transmission resources, Table 1 is repeatedly applied with respect to subsequent four unit D2D data transmission resources, and Table 1 is repeatedly applied with respect to the last four unit D2D data transmission resources.

Hereinafter, a method of generating a changed pattern based on a basic pattern with X=8 and Y=4, will be described.

Table 5 provided below shows (8, 4) basic pattern based on Hadamard code.

TABLE 5

|  | 1st unit D2D data transmission resource | 2nd unit D2D data transmission resource | 3rd unit D2D data transmission resource | 4th unit D2D data transmission resource | 5th unit D2D data transmission resource | 6th unit D2D data transmission resource | 7th unit D2D data transmission resource | 8th unit D2D data transmission resource |
|---|---|---|---|---|---|---|---|---|
| (8, 4) basic pattern 0 | +1 | −1 | +1 | −1 | +1 | −1 | +1 | −1 |
| (8, 4) basic pattern 1 | +1 | +1 | −1 | −1 | +1 | +1 | −1 | −1 |
| (8, 4) basic pattern 2 | +1 | −1 | −1 | +1 | +1 | −1 | −1 | +1 |
| (8, 4) basic pattern 3 | +1 | +1 | +1 | +1 | −1 | −1 | −1 | −1 |
| (8, 4) basic pattern 4 | +1 | −1 | +1 | −1 | −1 | +1 | −1 | +1 |
| (8, 4) basic pattern 5 | +1 | +1 | −1 | −1 | −1 | −1 | +1 | +1 |
| (8, 4) basic pattern 6 | +1 | −1 | −1 | +1 | −1 | +1 | +1 | −1 |
| (8, 4) basic pattern 7 | −1 | +1 | −1 | +1 | −1 | +1 | −1 | +1 |
| (8, 4) basic pattern 8 | −1 | −1 | +1 | +1 | −1 | −1 | +1 | +1 |
| (8, 4) basic pattern 9 | −1 | +1 | +1 | −1 | −1 | +1 | +1 | −1 |
| (8, 4) basic pattern 10 | −1 | −1 | −1 | −1 | +1 | +1 | +1 | +1 |
| (8, 4) basic pattern 11 | −1 | +1 | −1 | +1 | +1 | −1 | +1 | −1 |
| (8, 4) basic pattern 12 | −1 | −1 | +1 | +1 | +1 | +1 | −1 | −1 |
| (8, 4) basic pattern 13 | −1 | +1 | +1 | −1 | +1 | −1 | −1 | +1 |

(8, 4) basic patterns of Table 5 are identical to (8, 4) basic patterns disclosed in FIG. 9.

In this instance, the following cases of $L_i$ will be considered. In this instance, $A_i \cdot M_s$ may be a multiple of 8.

$$L_i = 1 \text{(in this instance, } A_i \cdot M_s = 8) \qquad 1)$$

According to the above mentioned method, (Xnew, Ynew)=(8, 1) may be generated from (X, Y)=(8, 4). That is, except for a first selected D2D data transmission resource in each (8, 4) basic pattern of Table 5, the remaining D2D data transmission resources may not be the selected D2D data transmission resource, irrespective of a code value of (8, 4) basic pattern. This may be expressed by Table 6.

Alternatively, Table 7 may be used, in which a pattern of first two unit D2D data transmission resources is identical to (2, 1) pattern. That is, according to Table 7, with respect to eight unit D2D data transmission resources ($A_i \cdot M_s = 8$), the (2, 1) pattern of Table 4 may be applied to first two unit D2D data transmission resources, and D2D data is not transmitted through the six remaining unit D2D transmission resources.

TABLE 6

|  | $1^{st}$ unit D2D data transmission resource | $2^{nd}$ unit D2D data transmission resource | $3^{rd}$ unit D2D data transmission resource | $4^{th}$ unit D2D data transmission resource | $5^{th}$ unit D2D data transmission resource | $6^{th}$ unit D2D data transmission resource | $7^{th}$ unit D2D data transmission resource | $8^{th}$ unit D2D data transmission resource |
|---|---|---|---|---|---|---|---|---|
| (8, 1) basic pattern 0 | +1 | −1 | −1 | −1 | −1 | −1 | −1 | −1 |
| (8, 1) basic pattern 1 | +1 | −1 | −1 | −1 | −1 | −1 | −1 | −1 |
| (8, 1) basic pattern 2 | +1 | −1 | −1 | −1 | −1 | −1 | −1 | −1 |
| (8, 1) basic pattern 3 | +1 | −1 | −1 | −1 | −1 | −1 | −1 | −1 |
| (8, 1) basic pattern 4 | +1 | −1 | −1 | −1 | −1 | −1 | −1 | −1 |
| (8, 1) basic pattern 5 | +1 | −1 | −1 | −1 | −1 | −1 | −1 | −1 |
| (8, 1) basic pattern 6 | +1 | −1 | −1 | −1 | −1 | −1 | −1 | −1 |
| (8, 1) basic pattern 7 | −1 | +1 | −1 | −1 | −1 | −1 | −1 | −1 |
| (8, 1) basic pattern 8 | −1 | −1 | +1 | −1 | −1 | −1 | −1 | −1 |
| (8, 1) basic pattern 9 | −1 | +1 | −1 | −1 | −1 | −1 | −1 | −1 |
| (8, 1) basic pattern 10 | −1 | −1 | −1 | −1 | +1 | −1 | −1 | −1 |
| (8, 1) basic pattern 11 | −1 | +1 | −1 | −1 | −1 | −1 | −1 | −1 |
| (8, 1) basic pattern 12 | −1 | −1 | +1 | −1 | −1 | −1 | −1 | −1 |
| (8, 1) basic pattern 13 | −1 | +1 | −1 | −1 | −1 | −1 | −1 | −1 |

TABLE 7

|  | $1^{st}$ unit D2D data transmission resource | $2^{nd}$ unit D2D data transmission resource | $3^{rd}$ unit D2D data transmission resource | $4^{th}$ unit D2D data transmission resource | $5^{th}$ unit D2D data transmission resource | $6^{th}$ unit D2D data transmission resource | $7^{th}$ unit D2D data transmission resource | $8^{th}$ unit D2D data transmission resource |
|---|---|---|---|---|---|---|---|---|
| (8, 1) basic pattern 0 | +1 | −1 | −1 | −1 | −1 | −1 | −1 | −1 |
| (8, 1) basic pattern 1 | −1 | +1 | −1 | −1 | −1 | −1 | −1 | −1 |

$$L_i = 2 \text{(in this instance, } A_i \cdot M_s = 8) \qquad 2)$$

According to the above mentioned method, (Xnew, Ynew)=(8, 2) may be generated from (X, Y)=(8, 4). That is, the remaining D2D data transmission resources, excluding first two selected D2D data transmission resources in each (8, 4) basic pattern of Table 5, may not be the selected D2D data transmission resources, irrespective of a code value of the (8, 4) basic pattern. This may be expressed by Table 8.

Alternatively, Table 9 may be used, in which a pattern of first four unit D2D data transmission resources is identical to (4, 2) pattern. That is, according to Table 9, with respect to eight unit D2D data transmission resources ($A_i \cdot M_s$=8), the (4, 2) pattern of Table 1 may be applied to first four unit D2D data transmission resources, and D2D data is not transmitted through the four remaining unit D2D transmission resources.

TABLE 8

|  | 1$^{st}$ unit D2D data transmission resource | 2$^{nd}$ unit D2D data transmission resource | 3$^{rd}$ unit D2D data transmission resource | 4$^{th}$ unit D2D data transmission resource | 5$^{th}$ unit D2D data transmission resource | 6$^{th}$ unit D2D data transmission resource | 7$^{th}$ unit D2D data transmission resource | 8$^{th}$ unit D2D data transmission resource |
| --- | --- | --- | --- | --- | --- | --- | --- | --- |
| (8, 2) basic pattern 0 | +1 | −1 | +1 | −1 | −1 | −1 | −1 | −1 |
| (8, 2) basic pattern 1 | +1 | +1 | −1 | −1 | −1 | −1 | −1 | −1 |
| (8, 2) basic pattern 2 | +1 | −1 | −1 | +1 | −1 | −1 | −1 | −1 |
| (8, 2) basic pattern 3 | +1 | +1 | −1 | −1 | −1 | −1 | −1 | −1 |
| (8, 2) basic pattern 4 | +1 | −1 | +1 | −1 | −1 | −1 | −1 | −1 |
| (8, 2) basic pattern 5 | +1 | +1 | −1 | −1 | −1 | −1 | −1 | −1 |
| (8, 2) basic pattern 6 | +1 | −1 | −1 | +1 | −1 | −1 | −1 | −1 |
| (8, 2) basic pattern 7 | −1 | +1 | −1 | +1 | −1 | −1 | −1 | −1 |
| (8, 2) basic pattern 8 | −1 | −1 | +1 | +1 | −1 | −1 | −1 | −1 |
| (8, 2) basic pattern 9 | −1 | +1 | +1 | −1 | −1 | −1 | −1 | −1 |
| (8, 2) basic pattern 10 | −1 | −1 | −1 | −1 | +1 | +1 | −1 | −1 |
| (8, 2) basic pattern 11 | −1 | +1 | −1 | +1 | −1 | −1 | −1 | −1 |
| (8, 2) basic pattern 12 | −1 | −1 | +1 | +1 | −1 | −1 | −1 | −1 |
| (8, 2) basic pattern 13 | −1 | +1 | +1 | −1 | −1 | −1 | −1 | −1 |

TABLE 9

|  | 1$^{st}$ unit D2D data transmission resource | 2$^{nd}$ unit D2D data transmission resource | 3$^{rd}$ unit D2D data transmission resource | 4$^{th}$ unit D2D data transmission resource | 5$^{th}$ unit D2D data transmission resource | 6$^{th}$ unit D2D data transmission resource | 7$^{th}$ unit D2D data transmission resource | 8$^{th}$ unit D2D data transmission resource |
| --- | --- | --- | --- | --- | --- | --- | --- | --- |
| (8, 2) basic pattern 0 | +1 | −1 | +1 | −1 | −1 | −1 | −1 | −1 |
| (8, 2) basic pattern 1 | +1 | +1 | −1 | −1 | −1 | −1 | −1 | −1 |
| (8, 2) basic pattern 2 | +1 | −1 | −1 | +1 | −1 | −1 | −1 | −1 |

TABLE 9-continued

| | 1st unit D2D data transmission resource | 2nd unit D2D data transmission resource | 3rd unit D2D data transmission resource | 4th unit D2D data transmission resource | 5th unit D2D data transmission resource | 6th unit D2D data transmission resource | 7th unit D2D data transmission resource | 8th unit D2D data transmission resource |
|---|---|---|---|---|---|---|---|---|
| (8, 2) basic pattern 3 | −1 | +1 | −1 | +1 | −1 | −1 | −1 | −1 |
| (8, 2) basic pattern 4 | −1 | −1 | +1 | +1 | −1 | −1 | −1 | −1 |
| (8, 2) basic pattern 5 | −1 | +1 | +1 | −1 | −1 | −1 | −1 | −1 |

$$L_i=4 \text{(in this instance, } A_i \cdot M_s=8) \quad 3)$$

According to the above mentioned method, (Xnew, Ynew)=(8, 4) may be generated from (X, Y)=(8, 4). That is, Table 5 may be applied, as it is, with respect to eight unit D2D data transmission resources ($A_i \cdot M_s=8$).

$$L_i=8 \text{(in this instance, } A_i \cdot M_s=16) \quad 4)$$

According to the above mentioned method, (Xnew, Ynew)=(16, 8) may be generated from (X, Y)=(8, 4). That is, (Xnew, Ynew)=(16, 8) may be generated from (Xrep, Yrep)=(16.8), which is obtained by repeating (X, Y)=(8, 4) two times. That is, with respect to 16 unit D2D data transmission resources ($A_i \cdot M_s=16$), Table 5 may be applied as it is, with respect to first eight unit D2D data transmission resources, and Table 5 may be applied repeatedly with respect to the eight remaining unit D2D data transmission resources.

Figure 13:
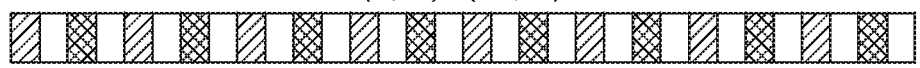
FIG. 13 is a conceptual diagram illustrating a method of generating a changed pattern based on a basic pattern according to an exemplary embodiment.
Figure 13:
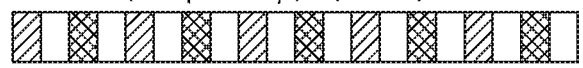

FIG. 13 is a conceptual diagram illustrating a method of generating a changed pattern based on a basic pattern according to an exemplary embodiment.

As described above, it is assumed that the case in which $L_i$ selected D2D data transmission resources out of $A_i \cdot M_s$ D2D data transmission resources are used with respect to a single D2D data transmission unit. Hereinafter, a method of generating a changed pattern when X is greater than $A_i \cdot M_s$, will be described.

Referring to FIG. 13, the case of $X>A_i \cdot M_s$ will be described. A changed pattern may be determined based on $A_i \cdot M_s$ D2D data transmission resources, which are temporally earlier from among D2D data transmission resources.

For example, when $A_i \cdot M_s=10$, a basic pattern with X=16 may be applied. In this instance, the changed pattern may be determined based on only 10 D2D data transmission resources that are temporally earlier out of the D2D data transmission resources of the basic pattern.

When X is decreased to Xred, Y may be decreased to Yred.

For example, when X=16, Y=8, and $A_i \cdot M_s=10$, first 10 D2D data transmission resources out of 16 D2D data transmission resources of the basic pattern may be determined as D2D data transmission resources (Xred). The number of selected D2D data transmission resources (Yred) may be decreased to 4, 5, or 6.

$$Yred>L_i \quad 1)$$

Only $L_i$ selected D2D data transmission resources that are temporally earlier from among the selected D2D data transmission resources (Yrep) may be determined as D2D data transmission resources (Ynew).

For example, when Yred is 4 and $L_i$ is 2, two D2D data transmission resource that are temporally earlier out of 4 D2D data transmission resources corresponding to Yred may be determined as the selected D2D data transmission resources (Ynew). Traffic data may be transmitted only through the selected D2D data transmission resources (Ynew). Traffic data may not be transmitted in the two remaining selected D2D data transmission resources.

$$Yred=L_i \quad 2)$$

Traffic data may be transmitted through the selected D2D data transmission resources (Yred).

For example, when Yred=4 and L=4, traffic data may be transmitted on the selected D2D data transmission resources, without separately generating a separate changed pattern.

$$Yred<L_i \quad 3)$$

In addition to selected D2D data transmission resources (Yred), L-Yred D2D data transmission resources that are temporally earlier out of D2D data transmission resources remaining after excluding the selected D2D data transmission resources (Yred) from the D2D data transmission resources (Xred) may be additionally set as the selected D2D data transmission resources (Ynew).

For example, when Xred=10, Yred=4, and L=8, 4 D2D data transmission resources that are temporally earlier out of 6 D2D data transmission resources remaining after excluding the selected D2D data transmission resources (Yred) from the D2D data transmission resources (Xred), may be additionally set as the selected D2D data transmission resources (Ynew).

A basic pattern for a T-RPT may be determined variously. As described above, when a hadamard code having a length of 4 is used, the number of possible basic patterns for a T-RPT is 6. When a hadamard code having a length of 8 is used, the number of possible basic patterns for a T-RPT is 14. When a hadamard code having a length of 16 is used, the number of possible basic patterns for a T-RPT is 30. When a hadamard code having a length of 32 is used, the number of possible basic patterns for a T-RPT is 62. When a hadamard code having a length of 64 is used, the number of possible basic patterns for a T-RPT is 126.

Figure 14:
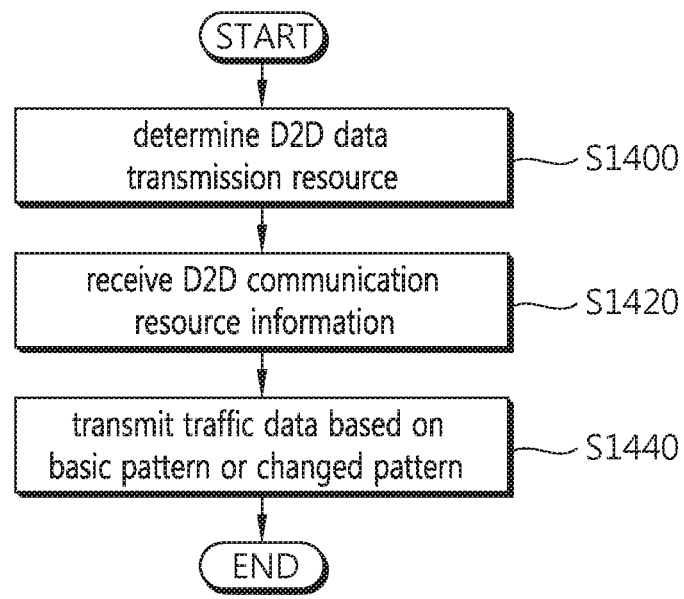
FIG. 14 is a flowchart illustrating an operation of transmitting traffic data of a user equipment according to an exemplary embodiment.

FIG. 14 is a flowchart illustrating an operation of transmitting traffic data of a user equipment according to an exemplary embodiment.

Referring to FIG. 14, a D2D data transmission resource is determined in operation S1400.

For example, a UE may receive cell-specific information for D2D communication (for example, information associated with a D2D data allocation period, information associated with a D2D data transmission resource offset, information associated with a D2D data transmission resource bitmap, and information associated with the number of repetitions of a D2D data transmission resource bitmap) and UE-specific information for D2D communication (for example, D2D data transmission resource allocation information), through various methods (SIB, PD2DSCH, RRC, D2D SA resources or the like). The UE may determine a D2D data transmission resource based on cell-specific information for D2D communication and UE-specific information (UE group-specific information) for D2D communication.

The UE receives D2D communication resource information for transmitting a single D2D data transmission unit in operation S1420.

The UE may receive information associated with the number $A_i$ of repetitions of a D2D data transmission resource bitmap for a single D2D data transmission unit, information associated with the number $M_s$ of D2D data transmission resources that are based on a single D2D data transmission resource bitmap, and information associated with the number $L_i$ of selected D2D data transmission resources for a single D2D data transmission unit.

The UE transmits traffic data through D2D data transmission resources selected based on a basic pattern or a pattern modified from the basic pattern, in operation S1440.

As disclosed in FIGS. 11 to 13, whether the basic pattern is modified may be determined by comparing sizes between X (Xrep or Xred) and $A_i \cdot M_s$, and sizes between Y (Yrep or Yred) and $L_i$.

The UE may transmit traffic data based on the basic pattern when modification of the basic pattern is not needed, and may transmit traffic data based on a changed pattern when the modification is needed.

FIG. 15 is a block diagram illustrating a base station (BS) and a user equipment (UE) according to an exemplary embodiment.

Referring to FIG. 15, a BS may include a D2D communication resource determining unit 1500, a D2D communication resource information generating unit 1510, a communication unit 1520, and a processor 1530.

The UE may include a pattern determining unit 1540, a communication unit 1550, and a processor 1560. The component elements of the UE and the BS disclosed in FIG. 15 are configured for illustrative purposes, and a single component element may be embodied as a plurality of component elements or a plurality of component elements may be embodied as a single component element.

The component elements of the UE and the BS may be embodied for executing the operations of the BS and the UE, which have been described in FIGS. 4 to 14. For example, the component elements of the BS and the UE may execute the following operations.

The D2D communication resource determining unit 1500 may determine the number of D2D data transmission resources and the number of selected D2D data transmission resources, for transmitting a single D2D data transmission unit.

The D2D communication resource information generating unit 1510 of the BS may be embodied to generate information associated with the number of D2D data transmission resources and the number of selected D2D data transmission resources, for transmitting a single D2D data transmission unit, which are determined by the D2D communication resource determining unit 1500.

The communication unit 1520 of the BS may be embodied to transmit, to the UE, the information associated with the number of D2D data transmission resources and the number of selected D2D data transmission resources, for transmitting a single D2D data transmission unit.

The processor 1530 of the BS may be embodied to control the operations of the D2D communication resource determining unit 1500, the D2D communication resource information generating unit 1510, and the communication unit 1520.

The communication unit 1550 of the UE may receive, from the communication unit 1520 of the BS, the information associated with the number of D2D data transmission resources and the number of selected D2D data transmission resources, for transmitting a single D2D data transmission unit.

The pattern determining unit 1540 may determine a pattern for transmitting a single D2D data transmission unit, based on the information associated with the number of D2D data transmission resources and the number of selected D2D data transmission resources for transmitting a single D2D data transmission unit, which is received from the communication unit 1520 of the BS. As disclosed in FIGS. 11 to 13, the pattern determining unit 1540 may determine a basic pattern or a changed pattern modified from the basic pattern for transmitting traffic data, by comparing sizes between X (Xrep or Xred) and $A_i \cdot M_s$, and sizes between Y (Yrep or Yred) and $L_i$.

The processor 1560 of the UE may be embodied to control the operations of the pattern determining unit 1540 and the communication unit 1550.

According to an exemplary embodiment, the pattern determining unit 1540 may be configured in one or more processors, e.g., the processor 1560. Software features of the pattern determining unit 1540 may be stored in a memory and may be executed by the one or more processors. The communication unit 1550 may be a wireless transceiver or the UE separately include a wireless transceiver.

The wireless transceiver may receive configuration information associated with a D2D data transmission resource, the configuration information including information of a D2D data allocation period and being transmitted from an evolved NodeB (eNB). The one or more processors may determine a D2D data transmission resource in each D2D data allocation period, the D2D data transmission resource including a pool of subframes, and select D2D data transmission subframes from among the pool of subframes based on a changed pattern, the changed pattern being derived from a basic pattern. The wireless transceiver transmits, from the UE to another UE, D2D data based on the selected D2D data transmission subframes.

When the number of subframes in the pool of subframes is greater than a length of the basic pattern, the one or more processors may be configured to determine the changed pattern by repeating the basic pattern. A length of the changed pattern may correspond to the number of subframes in the pool of subframes.

The changed pattern may include a partial portion of the basic pattern at an end of the changed pattern without having the remaining portion of the basic pattern. In the basic pattern, the partial portion of the basic pattern precedes the remaining portion of the basic pattern.

The one or more processors may be configured to determine (R mod X), wherein R corresponds to the number of subframes in the pool of subframes and X corresponds to a length of the basic pattern, where R and X are natural numbers. The changed pattern may include a first part and a second part, the first part of the changed pattern including at least one repetition of the basic pattern, and a length of the second part of the changed pattern may correspond to (R mod X).

When the number of subframes in the pool of subframes is less than a length of the basic pattern, the one or more processors may be configured to determine the changed pattern based on a value of (R mod X), wherein R corresponds to the number of subframes in the pool of subframes and X corresponds to a length of the basic pattern, where R and X are natural numbers. A length of the changed pattern may correspond to the number of subframes in the pool of subframes.

The changed pattern may consist of a first part of the basic pattern. In the basic pattern, the first part of the basic pattern preceding the remaining part of the basic pattern, and a length of the changed pattern corresponds to (R mod X).

According to an exemplary embodiment, the wireless transceiver of the UE may receive configuration information associated with a D2D data transmission resource, the configuration information being transmitted from an evolved NodeB (eNB). The one or more processors of the UE may determine a D2D data transmission resource, the D2D data transmission resource including a pool of subframes, and select D2D data transmission subframes from among the pool of subframes based on a changed pattern, the changed pattern being determined based on (R mod X), wherein R corresponds to the number of subframes in the pool of subframes and X corresponds to a length of a basic pattern, where R and X are natural numbers. The wireless transceiver may transmit, from the UE to another UE, D2D data based on the selected D2D data transmission subframes. A length of the changed pattern may correspond to R.

The changed pattern may include a first part and a second part, a length of the first part corresponds to $\lfloor R/X \rfloor$, and a length of the second part corresponds to (R mod X).

The second part of the changed pattern may correspond to a partial portion of the basic pattern.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A user equipment (UE) to transmit device-to-device (D2D) data using a D2D data transmission resource, comprising:
   a wireless transceiver configured to:
      receive configuration information associated with a D2D data transmission resource, the configuration information comprising information of a D2D data allocation period and being transmitted from an evolved NodeB (eNB); and
   one or more processors configured to:
      determine a D2D data transmission resource in each D2D data allocation period, the D2D data transmission resource comprising a pool of subframes; and
      select D2D data transmission subframes from among the pool of subframes based on a changed pattern, the changed pattern being derived from a basic pattern,
   wherein the wireless transceiver transmits, from the UE to another UE, D2D data based on the selected D2D data transmission subframes,
   wherein selecting of the D2D data transmission subframes comprises:
   the one or more processors is configured to determine, based on whether the number of subframes in the pool of subframes is less than a length of the basic pattern, the changed pattern based on a value of (R modulo X), wherein R corresponds to the number of subframes in the pool of subframes and X corresponds to the length of the basic pattern, where R and X are natural numbers,
   wherein a length of the changed pattern corresponds to the number of subframes in the pool of subframes.

2. The UE of claim 1, wherein:
   the changed pattern comprises a partial portion of the basic pattern at an end of the changed pattern without having the remaining portion of the basic pattern.

3. The UE of claim 2, wherein:
   in the basic pattern, the partial portion of the basic pattern precedes the remaining portion of the basic pattern.

4. The UE of claim 1, wherein selecting of the D2D data transmission subframes comprises:
   determining, based on a determination that the number of subframes in the pool of subframes is greater than a length of the basic pattern, the changed pattern by repeating the basic pattern.

5. The UE of claim 4, wherein the one or more processors is configured to determine (R modulo X),
   wherein the changed pattern comprises a first part and a second part, the first part of the changed pattern comprising at least one repetition of the basic pattern, and
   wherein a length of the second part of the changed pattern corresponds to (R modulo X).

6. The UE of claim 1, wherein:
   the changed pattern consists of a first part of the basic pattern;
   in the basic pattern, the first part of the basic pattern preceding the remaining part of the basic pattern; and
   a length of the changed pattern corresponds to (R modulo X).

* * * * *